US012785245B2

(12) United States Patent
Sadri et al.

(10) Patent No.: US 12,785,245 B2
(45) Date of Patent: Nov. 3, 2026

(54) NON-INVASIVE COMMUNICATION APPARATUS AND METHOD

(71) Applicant: Airgain, Inc., San Diego, CA (US)

(72) Inventors: Ali Sadri, San Diego, CA (US); Cheng-Yuan Chin, San Diego, CA (US); Shenjie Miao, San Diego, CA (US)

(73) Assignee: Airgain, Inc., San Diego, CA (US)

( * ) Notice: Subject to any disclaimer, the term of this patent is extended or adjusted under 35 U.S.C. 154(b) by 72 days.

(21) Appl. No.: 18/895,772

(22) Filed: Sep. 25, 2024

(65) Prior Publication Data

US 2025/0015477 A1 Jan. 9, 2025

Related U.S. Application Data

(63) Continuation of application No. 18/080,953, filed on Dec. 14, 2022, now Pat. No. 12,107,319.

(Continued)

(51) Int. Cl.
*H01Q 1/12* (2006.01)
*H01Q 1/32* (2006.01)
(Continued)

(52) U.S. Cl.
CPC ......... *H01Q 1/1271* (2013.01); *H01Q 1/3275* (2013.01); *H02J 50/10* (2016.02); *H04B 5/263* (2024.01); *H04B 5/266* (2024.01)

(58) Field of Classification Search
CPC ... H01Q 1/1271; H01Q 1/1285; H01Q 1/3275
See application file for complete search history.

(56) References Cited

U.S. PATENT DOCUMENTS 5,471,222 A 11/1995 Du
5,959,581 A 9/1999 Fusinski
(Continued)

FOREIGN PATENT DOCUMENTS

KR 20130026253 A 3/2013
WO WO 2011/076793 A1 6/2011
(Continued)

OTHER PUBLICATIONS

International Patent Application No. PCT/US2022/052782, filed Dec. 14, 2022, International Search Report and Written Opinion, issued Apr. 14, 2023, 27 pages.
(Continued)

*Primary Examiner* — Hoang V Nguyen
(74) *Attorney, Agent, or Firm* — Mueting Raasch Group

(57) ABSTRACT

A non-invasive communication apparatus for a vehicle comprising glass includes a power transfer coupler configured to wirelessly supply vehicle-generated power, via the glass, to an external antenna assembly mounted to the vehicle. The power transfer coupler comprises a substantially transparent transmit coil disposed on an inside surface of the glass and a substantially transparent receive coil disposed on an outside surface of the glass adjacent the transmit coil. One or more information transfer couplers are configured to wirelessly communicate information signals to and/or from the antenna assembly via the glass. Each of the information transfer couplers comprises a substantially transparent first coupler disposed on the inside surface of the glass and a substantially transparent second coupler disposed on the outside surface of the glass adjacent the first coupler.

21 Claims, 13 Drawing Sheets

Related U.S. Application Data

(60) Provisional application No. 63/290,039, filed on Dec. 15, 2021.

(51) Int. Cl.

| | |
|---|---|
| ***H02J 50/10*** | (2016.01) |
| ***H04B 5/26*** | (2024.01) |

(56) References Cited

U.S. PATENT DOCUMENTS

| | | | | |
|---|---|---|---|---|
| 10,511,086 | B1 | 12/2019 | Thill | |
| 10,899,298 | B2 | 1/2021 | Kang | |
| 2002/0060646 | A1 | 5/2002 | Petros | |
| 2006/0062515 | A1 | 3/2006 | Mahbobi | |
| 2008/0267112 | A1 | 10/2008 | Lucidarme | |
| 2017/0237148 | A1 | 8/2017 | Patel | |
| 2019/0320498 | A1 | 10/2019 | Sadri | |
| 2019/0348754 | A1 | 11/2019 | Apostolos | |
| 2020/0298773 | A1* | 9/2020 | Kang | B60R 16/027 |
| 2021/0058122 | A1 | 2/2021 | Shinkawa | |
| 2021/0257724 | A1 | 8/2021 | Greenstein | |

FOREIGN PATENT DOCUMENTS

| | | | |
|---|---|---|---|
| WO | WO 2014/136545 | A1 | 9/2014 |
| WO | WO 2020/231763 | A1 | 11/2020 |

OTHER PUBLICATIONS

International Patent Application No. PCT/US2022/052782, filed Dec. 14, 2022, International Preliminary Report on Patentability, issued Jun. 27, 2024, 12 pages.

Verizon, Cradlepoint device, R2155-5GB (child), 2022, 3 pages.

Verizon, Cradlepoint device, R2105-5GB, 2022, 3 pages.

* cited by examiner

FIGURE 9A
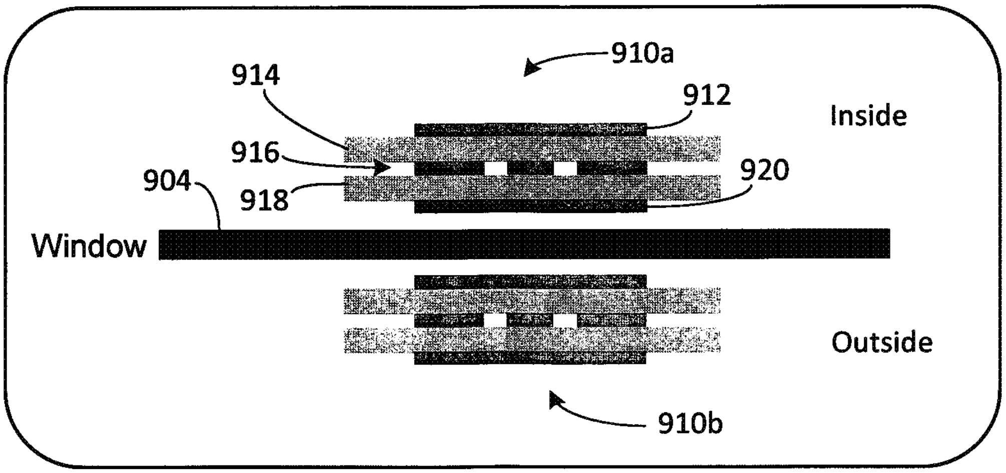
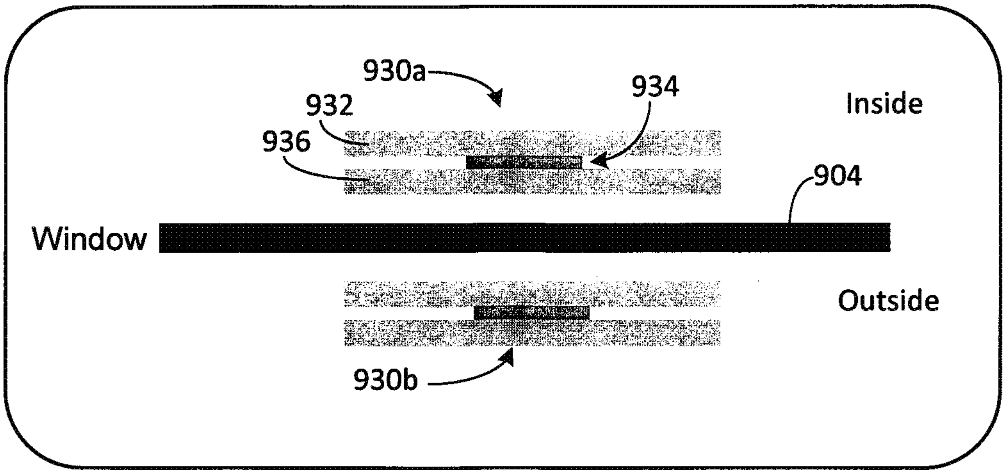
FIGURE 9B

NON-INVASIVE COMMUNICATION APPARATUS AND METHOD

This application is a Continuation of U.S. patent application Ser. No. 18/080,953, filed Dec. 14, 2022, which claims the benefit of U.S. Provisional Application No. 63/290,039, filed Dec. 15, 2021, the entire contents of which are hereby incorporated by reference.

SUMMARY

Embodiments are directed to a non-invasive communication apparatus for a vehicle comprising glass. The apparatus comprises a substantially transparent power transfer coupler configured to wirelessly supply vehicle-generated power to an external antenna assembly mounted to the vehicle via the glass, and a substantially transparent information transfer coupler configured to wirelessly communicate control signals and data to and/or from the antenna assembly via the glass.

Embodiments are directed to a non-invasive communication apparatus for a vehicle comprising glass, which includes a power transfer coupler configured to wirelessly supply vehicle-generated power, via the glass, to an external antenna assembly mounted to the vehicle. The power transfer coupler comprises a substantially transparent transmit coil disposed on an inside surface of the glass and a substantially transparent receive coil disposed on an outside surface of the glass adjacent the transmit coil. One or more information transfer couplers are configured to wirelessly communicate information signals to and/or from the antenna assembly via the glass. Each of the information transfer couplers comprises a substantially transparent first coupler disposed on the inside surface of the glass and a substantially transparent second coupler disposed on the outside surface of the glass adjacent the first coupler.

Embodiments are directed to a method of non-invasively communicating power and information to and/or from an antenna assembly mounted to a vehicle via glass of the vehicle. The method comprises coupling vehicle-generated power from a substantially transparent first power transfer coil disposed on an inside surface of the glass to a substantially transparent second power transfer coil disposed on an outside surface of the glass. The method also comprises routing the coupled power to the antenna assembly. The method further comprises coupling control signals and data to and/or from the antenna assembly via the glass using a substantially transparent first coupler disposed on the inside surface of the glass and a substantially transparent second coupler disposed on the outside surface of the glass.

Embodiments are directed to a non-invasive communication apparatus for a fixed structure comprising glass. The apparatus comprises a power transfer coupler configured to wirelessly transfer power via the glass of the fixed structure. The power transfer coupler comprises a substantially transparent transmit coil disposed on an inside surface of the glass, and a substantially transparent receive coil disposed on an outside surface of the glass adjacent the transmit coil. One or more information transfer couplers are configured to wirelessly communicate information signals via the glass. Each of the information transfer couplers comprises a substantially transparent first coupler disposed on the inside surface of the glass, and a substantially transparent second coupler disposed on the outside surface of the glass adjacent the first coupler.

Embodiments are directed to a method of non-invasively communicating power and information via glass of a fixed structure. The method comprises coupling power from a substantially transparent first power transfer coil disposed on an inside surface of the glass to a substantially transparent second power transfer coil disposed on an outside surface of the glass. The method also comprises routing the coupled power to electronic circuitry of an assembly disposed relative to the outside surface of the glass. The method further comprises coupling control signals and data to and/or from the electronic circuitry via the glass using a substantially transparent first coupler disposed on the inside surface of the glass and a substantially transparent second coupler disposed on the outside surface of the glass.

The above summary is not intended to describe each disclosed embodiment or every implementation of the present disclosure. The figures and the detailed description below more particularly exemplify illustrative embodiments.

BRIEF DESCRIPTION OF THE DRAWINGS

Throughout the specification reference is made to the appended drawings wherein:

FIG. 9A illustrates an example of substantially transparent coupling structures that facilitate coupling of data and information signals through glass of a vehicle in accordance with any of the embodiments disclosed herein;

FIG. 9B illustrates an example of substantially transparent coupling structures that facilitate coupling of data and information signals through glass of a vehicle in accordance with any of the embodiments disclosed herein;

The figures are not necessarily to scale. Like numbers used in the figures refer to like components. However, it will be understood that the use of a number to refer to a component in a given figure is not intended to limit the component in another figure labeled with the same number.

DETAILED DESCRIPTION

Figure 1:
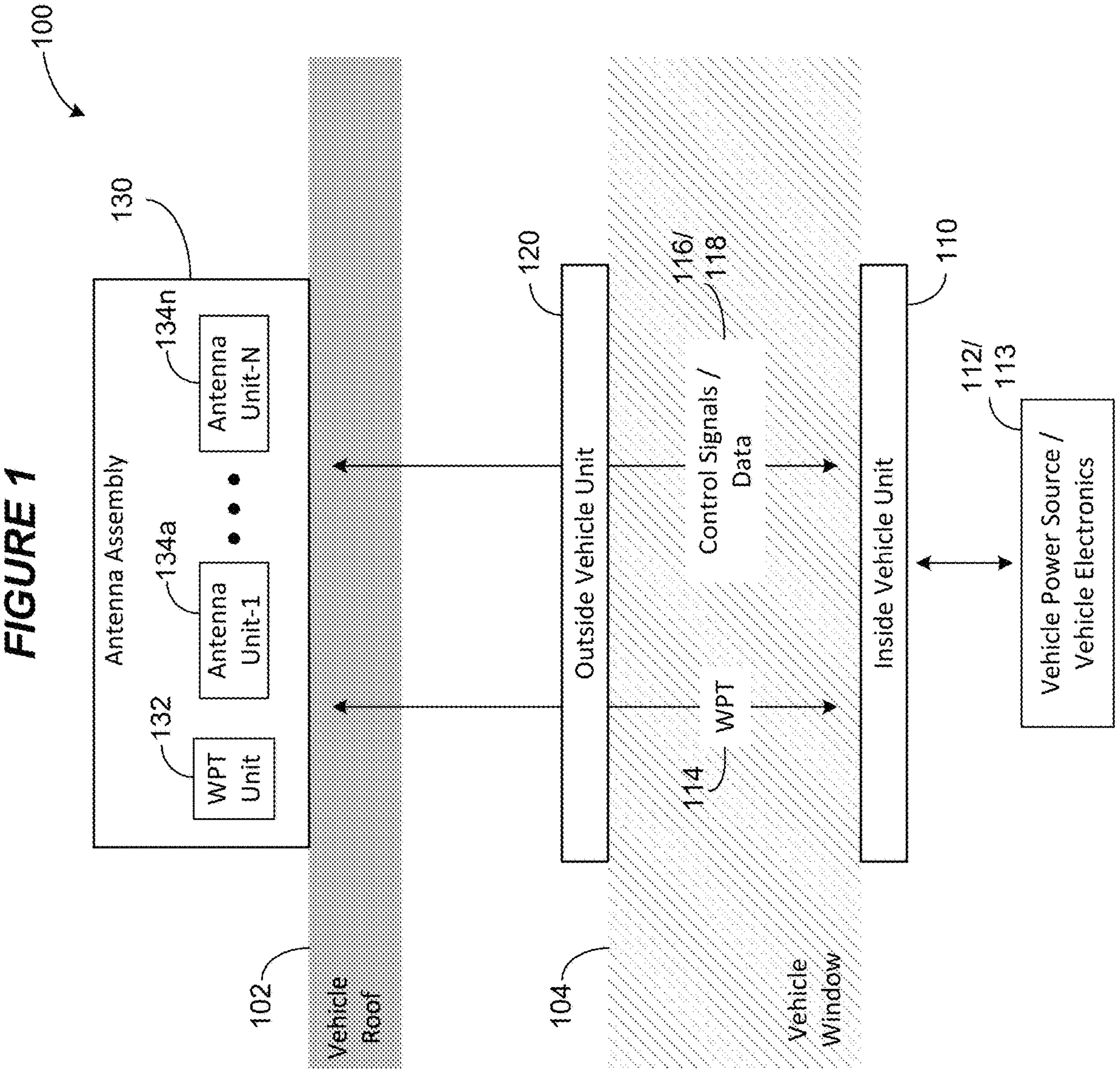
FIG. 1 illustrates a non-invasive communication apparatus for a vehicle in accordance with any of the embodiments disclosed herein.

Conventional techniques for installing an antenna apparatus on the roof of a vehicle require drilling of holes through the roof or other structures of the vehicle. Electrical wires are passed through the holes in order to connect components inside of the vehicle with components mounted on the exterior of the vehicle. This invasive approach to antenna apparatus installation irreparably alters the exterior of the vehicle, can result in damage to the roof or other structures, and provides an ingress pathway for water and other contaminants to enter into the interior of the vehicle.

Embodiments of the disclosure are directed to a non-invasive communication apparatus for a vehicle. Various embodiments are directed to wirelessly transmitting power and information signals between inside vehicle components and outside vehicle components via glass of the vehicle. Connections between the inside and outside vehicle components can be made without passing wires through the roof or other structure of the vehicle. Power and information signals are transmitted wirelessly through a glass structure of the vehicle. Embodiments are directed to both customized and aftermarket implementations.

The inside vehicle components and outside vehicle components are preferably substantially transparent such that an observer (e.g., a driver, passenger, pedestrian) of the vehicle can see through the inside vehicle components and outside vehicle components. The term substantially transparent encompasses gradation in transparency, including some degree of scattering. Notwithstanding the degree of transparency, a human observer can see through a substantially transparent article according to embodiments of the present disclosure. For example, articles of the present disclosure formed from various transparent materials, such as transparent conductive Indium Tin Oxide (ITO), transparent conductive Indium Zinc Oxide (IZO), transparent conductive Aluminum-doped Zinc Oxide (AZO), and transparent conductive carbon nanotube (CNT) film are considered to be substantially transparent in the context of various embodiments of the disclosure.

Embodiments of the disclosure are defined in the claims. However, below there is provided a non-exhaustive listing of non-limiting examples. Any one or more of the features of these examples may be combined with any one or more features of another example, embodiment, or aspect described herein.

Example Ex1. A non-invasive communication apparatus for a vehicle comprises a power transfer coupler configured to wirelessly supply vehicle-generated power, via glass of the vehicle, to an external antenna assembly mounted to the vehicle. The power transfer coupler comprises a substantially transparent transmit coil disposed on an inside surface of the glass, and a substantially transparent receive coil disposed on an outside surface of the glass adjacent the transmit coil. One or more information transfer couplers are configured to wirelessly communicate information signals to and/or from the antenna assembly via the glass. Each of the information transfer couplers comprises a substantially transparent first coupler disposed on the inside surface of the glass, and a substantially transparent second coupler disposed on the outside surface of the glass adjacent the first coupler.

Example Ex2. The apparatus according to Ex1, wherein the transmit coil is configured for affixation, via a substantially transparent adhesive, to the inside surface of the glass, and the receive coil is configured for affixation, via a substantially transparent adhesive, to the outside surface of the glass.

Example Ex3. The apparatus according to Ex1, wherein the transmit coil is an integrally formed structure of the inside surface of the glass, and the receive coil is an integrally formed structure of the outside surface of the glass.

Example Ex4. The apparatus according to one or more of Ex 1 to Ex3, wherein the first RF coupler is configured for affixation, via a substantially transparent adhesive, to the inside surface of the glass, and the second RF coupler is configured for affixation, via a substantially transparent adhesive, to the outside surface of the glass.

Example Ex5. The apparatus according to one or more of Ex1 to Ex3, wherein the first RF coupler is an integrally formed structure of the inside surface of the glass, and the second RF coupler is an integrally formed structure of the outside surface of the glass.

Example Ex6. The apparatus according to one or more of Ex1 to Ex5, wherein one or more of the information transfer couplers comprises one or both of a metal structure and a dielectric structure configured to transfer control signals and data via electrical or magnetic coupling.

Example Ex7. The apparatus according to one or more of Ex1 to Ex6, wherein the power transfer coupler comprises an equal number of transmit coils and receive coils.

Example Ex8. The apparatus according to one or more of Ex 1 to Ex6, wherein the power transfer coupler comprises an unequal number of transmit coils and receive coils.

Example Ex9. The apparatus according to one or more of Ex 1 to Ex8, wherein a first information transfer coupler is configured to communicate control signals to and/or from the antenna assembly via the glass, and a second information transfer coupler is configured to communicate data to and/or from the antenna assembly via the glass.

Example Ex 10. The apparatus according to one or more of Ex1 to Ex8, wherein one or more of the information transfer couplers are configured to communicate control signals and data to and/or from the antenna assembly via the glass.

Example Ex11. The apparatus according to one or more of Ex 1 to Ex10, comprising a modulator/demodulator unit configured to modulate and demodulate one or both of control signals and data transferred through the glass.

Example Ex 12. The apparatus according to one or more of Ex1 to Ex11, comprising an up/down converter configured to convert a low frequency control signal to a high frequency control signal and to convert a high frequency control signal to a low frequency control signal.

Example Ex 13. The apparatus according to one or more of Ex 1 to Ex12, wherein the antenna assembly comprises a single antenna housing and a plurality of disparate antenna units disposed in the housing.

Example Ex 14. The apparatus according to one or more of Ex1 to Ex12, wherein the antenna assembly comprises a plurality of antenna housings and a plurality of disparate antenna units disposed within, and distributed between, the housings.

Example Ex 15. The apparatus according to Ex14, wherein the power transfer coupler is configured to supply power to each of the plurality of antenna housings.

Example Ex 16. The apparatus according to one or more of Ex1 to Ex15, wherein the antenna assembly comprises a plurality of disparate antenna units, and each of the plurality of disparate antenna units is coupled to one of the information transfer couplers.

Example Ex 17. The apparatus according to one or more of Ex1 to Ex16, wherein the antenna assembly comprises one or more of a global positioning antenna unit, a cellular antenna unit, a WiFi® antenna unit, and a mmWave antenna unit.

Example Ex 18. The apparatus according to one or more of Ex 1 to Ex17, wherein the antenna assembly comprises at least one antenna and at least one modem operably coupled to the at least one antenna.

Example Ex 19. The apparatus according to one or more of Ex1 to Ex18, wherein the antenna assembly comprises a plurality of antennas and a plurality of modems each coupled to one of the antennas.

Example Ex20. A non-invasive communication apparatus for a vehicle comprising glass, the apparatus comprising a substantially transparent power transfer coupler configured to wirelessly supply vehicle-generated power to an external antenna assembly mounted to the vehicle via the glass, and a substantially transparent information transfer coupler configured to wirelessly communicate control signals and data to and/or from the antenna assembly via the glass.

Example Ex21. The apparatus according to Ex20, wherein a transmit component of the power transfer coupler is configured for affixation, via a substantially transparent adhesive, to the inside surface of the glass, and a receive component of the power transfer coupler is configured for affixation, via a substantially transparent adhesive, to the outside surface of the glass.

Example Ex22. The apparatus according to Ex20, wherein a transmit component of the power transfer coupler is an integrally formed structure of the inside surface of the glass, and a receive component of the power transfer coupler is an integrally formed structure of the outside surface of the glass.

Example Ex23. The apparatus according to one or more of Ex20 to Ex22, wherein a first component of the information transfer coupler is configured for affixation, via a substantially transparent adhesive, to the inside surface of the glass, and a second component of the information transfer coupler is configured for affixation, via a substantially transparent adhesive, to the outside surface of the glass.

Example Ex24. The apparatus according to one or more of Ex20 to Ex22, wherein a first component of the information transfer coupler is an integrally formed structure of the inside surface of the glass, and a second component of the information transfer coupler is an integrally formed structure of the outside surface of the glass.

Example Ex25. A method of non-invasively communicating power and information to and/or from an antenna assembly mounted to a vehicle via glass of the vehicle comprises coupling vehicle-generated power from a substantially transparent first power transfer coil disposed on an inside surface of the glass to a substantially transparent second power transfer coil disposed on an outside surface of the glass, routing the coupled power to the antenna assembly, and coupling control signals and data to and/or from the antenna assembly via the glass using a substantially transparent first coupler disposed on the inside surface of the glass and a substantially transparent second coupler disposed on the outside surface of the glass.

Example Ex26. A non-invasive communication apparatus for a fixed structure comprising glass, the apparatus comprising a power transfer coupler configured to wirelessly transfer power via the glass of the fixed structure. The power transfer coupler comprises a substantially transparent transmit coil disposed on an inside surface of the glass, and a substantially transparent receive coil disposed on an outside surface of the glass adjacent the transmit coil. One or more information transfer couplers are configured to wirelessly communicate information signals via the glass. Each of the information transfer couplers comprises a substantially transparent first coupler disposed on the inside surface of the glass, and a substantially transparent second coupler disposed on the outside surface of the glass adjacent the first coupler.

Example Ex27. The apparatus according to Ex26, wherein the transmit coil is configured for affixation, via a substantially transparent adhesive, to the inside surface of the glass, and the receive coil is configured for affixation, via a substantially transparent adhesive, to the outside surface of the glass.

Example Ex28. The apparatus according to Ex 26, wherein the transmit coil is an integrally formed structure of the inside surface of the glass, and the receive coil is an integrally formed structure of the outside surface of the glass.

Example Ex29. The apparatus according to one or more of Ex26 to Ex28, wherein the first coupler is configured for affixation, via a substantially transparent adhesive, to the inside surface of the glass, and the second coupler is configured for affixation, via a substantially transparent adhesive, to the outside surface of the glass.

Example Ex30. The apparatus according to one or more of Ex26 to Ex28, wherein the first coupler is an integrally formed structure of the inside surface of the glass, and the second coupler is an integrally formed structure of the outside surface of the glass.

Example Ex31. The apparatus according to one or more of Ex26 to Ex30, wherein one or more of the information transfer couplers comprises one or both of a metal structure and a dielectric structure configured to transfer control signals and data via electrical or magnetic coupling.

Example 32. The apparatus according to one or more of Ex26 to Ex31, wherein the power transfer coupler comprises an equal number of transmit coils and receive coils.

Example 33. The apparatus according to one or more of Ex26 to Ex31, wherein the power transfer coupler comprises an unequal number of transmit coils and receive coils.

Example 34. A method of non-invasively communicating power and information via glass of a fixed structure comprises coupling power from a substantially transparent first power transfer coil disposed on an inside surface of the glass to a substantially transparent second power transfer coil disposed on an outside surface of the glass, routing the coupled power to electronic circuitry of an assembly disposed relative to the outside surface of the glass, and coupling control signals and data to and/or from the electronic circuitry via the glass using a substantially transparent first coupler disposed on the inside surface of the glass and a substantially transparent second coupler disposed on the outside surface of the glass.

FIG. 1 illustrates a non-invasive communication apparatus for a vehicle in accordance with any of the embodiments disclosed herein. The apparatus 100 shown in FIG. 1 includes an inside vehicle unit (IVU) 110 and an outside vehicle unit (OVU) 120. The IVU 110 and the OVU 120 are wirelessly coupled to one another via glass 104 of the vehicle. The IVU 110 is operatively coupled to various components of the vehicle including a vehicle power source 112 and vehicle electronics 113. The OVU 120 is operatively coupled to an electronic device disposed on an exterior surface of the vehicle. For example, the external electronic device can be mounted to the roof 102 or other structure of the vehicle.

The external electronic device can include an antenna assembly 130. The antenna assembly 130 can include one or more antenna units 134*a*-134*n*. It is understood that the antenna units 134*a*-134*n* require power and signal communication with respect to the vehicle power source 112 and vehicle electronics 113. The IVU 110 and OVU 120 cooperate to transmit power, control signals, and data through the glass 104. More particularly, the IVU 110 and OVU 120 are arranged to facilitate wireless power transfer (WPT) 114 through the glass 104 to supply power to a WPT unit 132 of the antenna assembly 130. The IVU 110 and OVU 120 are also arranged to facilitate wireless transfer of control signals 116 and data 118 through the glass 104, thereby operatively coupling the antenna assembly 130 with the vehicle power source 112 and vehicle electronics 113.

Figure 2:
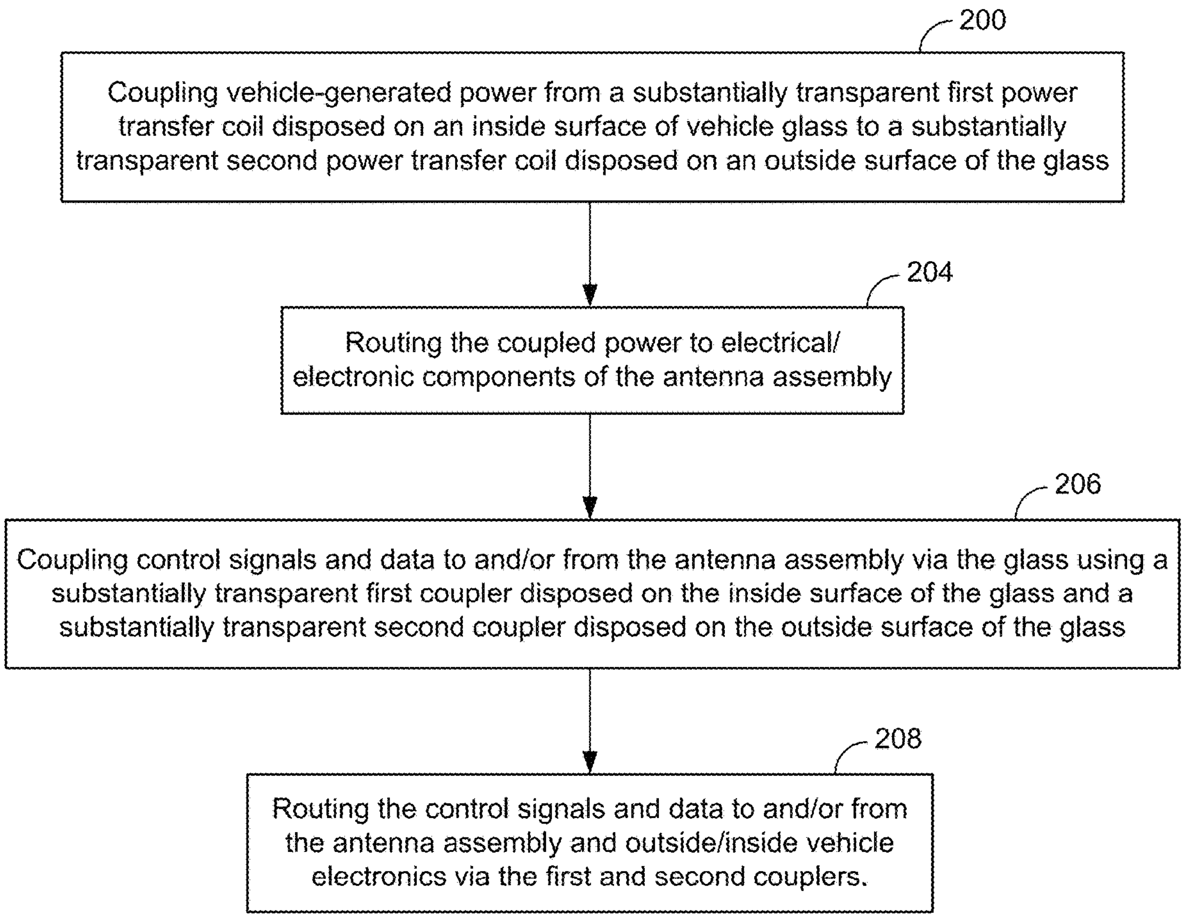
FIG. 2 illustrates a method for non-invasively communicating power and information to and/or from an antenna assembly mounted to a vehicle via glass of the vehicle in accordance with any of the embodiments disclosed herein.

FIG. 2 illustrates a method for non-invasively communicating power and information to and/or from an antenna assembly mounted to a vehicle via glass of the vehicle in accordance with any of the embodiments disclosed herein. The method shown in FIG. 2 involves coupling 200 vehicle-generated power from a substantially transparent first power transfer coil disposed on an inside surface of vehicle glass to a substantially transparent second power transfer coil disposed on an outside surface of the glass. The first power transfer coil and the second power transfer coil are components of a wireless power transfer coupler that wirelessly couples vehicle-generated power from inside the vehicle to the antenna assembly mounted to the vehicle via glass of the vehicle. In some approaches, the first power transfer coil can be affixed, via a substantially transparent adhesive, to the inside surface of the glass, and the second power transfer coil can be affixed, via a substantially transparent adhesive, to the outside surface of the glass. In other approaches, the first power transfer coil can be a structure formed on the inside surface of the glass, and the second power transfer coil can be a structure formed on the outside surface of the glass.

The method also involves routing 204 the coupled power to electrical/electronic components of the antenna assembly. The vehicle-generated power coupled from the first power transfer coil to the second power transfer coil is routed from the second power transfer coil to electrical/electronic components of the antenna assembly mounted to the vehicle (e.g., the vehicle roof). The electrical/electronic components of the antenna assembly include one or more antenna units, such as a plurality of disparate antenna units (e.g., a GPS antenna unit, an LTE antenna unit, a 5G antenna unit, a Wi-Fi® antenna unit, a mmWave antenna unit).

The method further involves coupling 206 control signals and data to and/or from the antenna assembly via the glass using a substantially transparent first information transfer coupler disposed on the inside surface of the glass and a substantially transparent second information transfer coupler disposed on the outside surface of the glass. The first and second information transfer couplers are components of an information transfer coupler (e.g., RF signal coupler) that wirelessly couples control signals (e.g., UART, $I^2C$, SPI signals) and data (e.g., cellular data, GPS data) between electrical/electronic components of the antenna assembly mounted to the vehicle and electronics inside the vehicle via glass of the vehicle. In some approaches, the first information coupler can be affixed, via a substantially transparent adhesive, to the inside surface of the glass, and the second information coupler can be affixed, via a substantially transparent adhesive, to the outside surface of the glass. In other approaches, the first information coupler can be a structure formed on the inside surface of the glass, and the second information coupler can be a structure formed on the outside surface of the glass.

The method also involves routing 208 the control signals and data to and/or from the antenna assembly and outside/inside vehicle electronics via the first and second couplers. For example, the first and second information transfer couplers wirelessly couple control signals and data between electrical/electronic components of the antenna assembly mounted to the vehicle and electronics inside the vehicle via glass of the vehicle. It will be appreciated that the method steps shown in FIG. 2 can be performed in a different order, and with other (e.g., additional or alternative) processes, than is shown in FIG. 2. It will also be appreciated that the method steps shown in FIG. 2 can be varied depending on a number of factors, including the components and functionality of the antenna assembly mounted to the vehicle and the components and functionality of the outside and inside vehicle electronics.

Figure 3A:
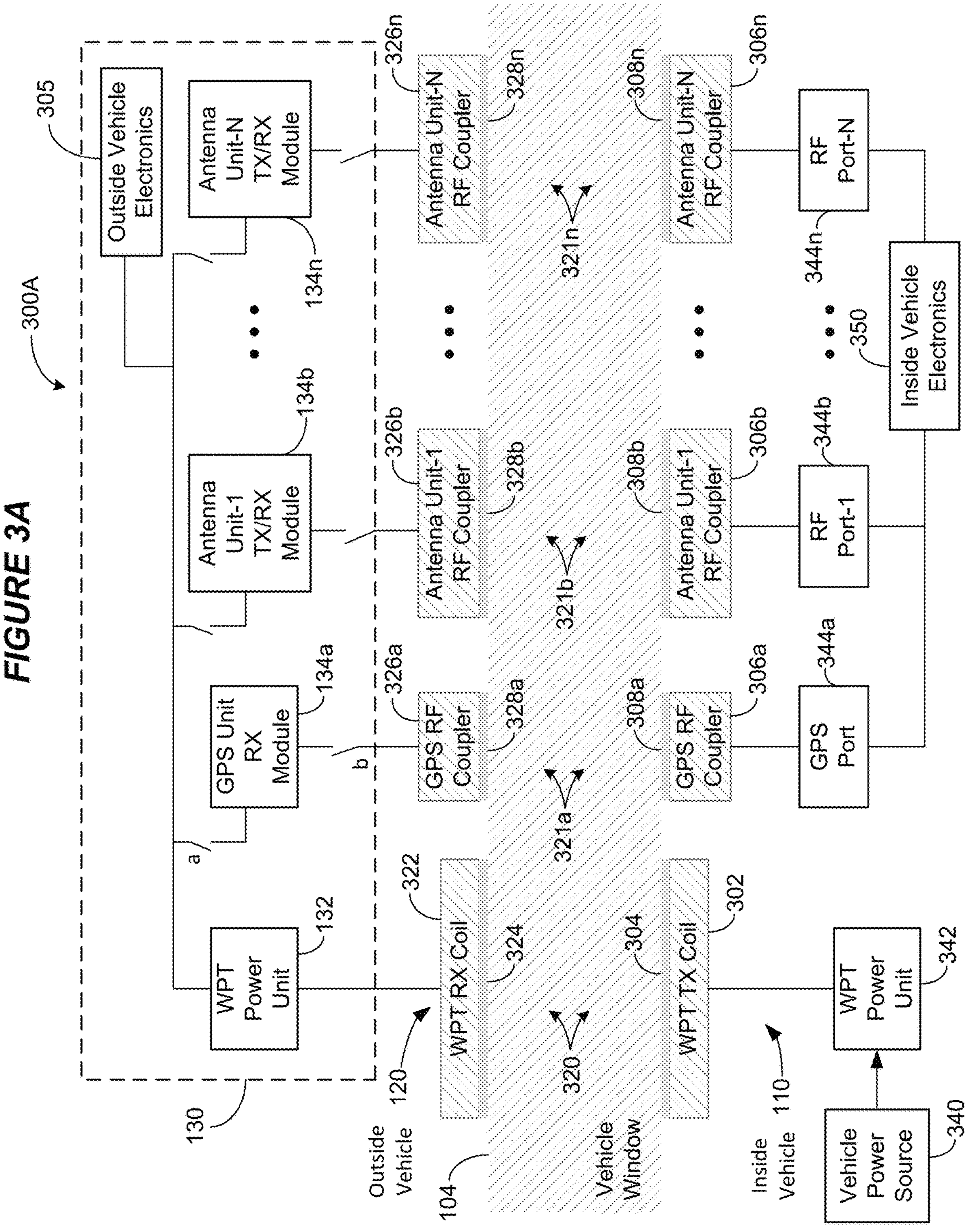
FIG. 3A illustrates a non-invasive communication apparatus for a vehicle in accordance with any of the embodiments disclosed herein.

FIG. 3A illustrates a non-invasive communication apparatus for a vehicle in accordance with any of the embodiments disclosed herein. The apparatus 300A includes a power transfer coupler 320 configured to wirelessly supply vehicle-generated power, via glass 104 of the vehicle, to an external antenna assembly 130 mounted to the vehicle. The power transfer coupler 320 includes a substantially transparent transmit coil 302 disposed on an inside surface of the glass 104. The power transfer coupler 320 also includes a substantially transparent receive coil 322 disposed on an outside surface of the glass 104 and positioned adjacent the transmit coil 302. The transmit and receive coils 302, 322 are configured to wirelessly transmit power from a WPT power unit 342 situated inside the vehicle to a WPT power unit 132 situated in an antenna assembly 130 mounted on the outside of the vehicle. The WPT power units 132 and 342 can be off-the-shelf automotive-grade units, such as those available from Efficient Power Conversion Corporation (e.g., models EPC9512 (TX) and EPC9514 (RX)).

In the embodiment shown in FIG. 3A, the transmit coil 302 is affixed to the inside surface of the glass 104 using a substantially transparent adhesive 304. The receive coil 322 is affixed to the outside surface of the glass 104 using a substantially transparent adhesive 324. The adhesives 304 and 324 can be the same or different type of substantially transparent adhesive. Suitable substantially transparent adhesives include transparent marine epoxy and other readily available adhesives (e.g., 3M™ Scotch-Weld™ Epoxy Potting Compound DP270, J-B Weld 31310 RTV Silicone Sealant/Adhesive).

The apparatus 300A also includes one or more information transfer couplers 321*a*-321*n* configured to wirelessly communicate information signals to and/or from the antenna assembly 130 via the glass 104. Each of the information transfer couplers 321*a*-321*n* includes a substantially transparent first coupler disposed on the inside surface of the glass 104. Each of the information transfer couplers 321*a*-321*n* also includes a substantially transparent second coupler disposed on the outside surface of the glass 104 and positioned adjacent the first RF coupler. The information transfer couplers 321*a*-321*n* can comprises one or both of a metal structure and a dielectric structure configured to transfer control signals and data via electrical or magnetic coupling.

In accordance with various embodiments, the antenna assembly 130 can include one or more antenna units 134*a*-134*n*. The antenna units 134*a*-134*n* can include one or any combination of a GPS antenna unit, an LTE antenna unit, a 5G antenna unit, a Wi-Fi® antenna unit, a mmWave antenna unit or other type of antenna unit. Additionally, the antenna assembly 130 can include outside vehicle electronics 305 operably coupled to one or more of the antenna units 134*a*-134*n* for communicating with inside vehicle electronics 350. Various outside and inside vehicle electronic components and combinations of components are contemplated.

For example, the outside vehicle electronics 305 can include a cellular modem (e.g., cellular embedded modem) coupled to cellular antenna(s), and the inside vehicle electronics 350 can include a WiFi® router and an access point coupled to WiFi® antenna(s). As another example, the outside vehicle electronics 305 can include a cellular modem, a WiFi® router, and an access point coupled to cellular and WiFi® antennas, and the inside vehicle electronics 350 can be devoid of a cellular modem, router, and an access point. By using additional digital-to-analog conversion (DAC) circuitry outside the vehicle and additional analog-to-digital conversion (ADC) circuitry inside the vehicle, this can facilitate the data and control signal transfer wirelessly. It is noted that a modem can be configured to modulate and demodulate one or both of control signals and data transferred through the glass 104. It is also noted that an up/down converter can be configured to convert a low frequency control signal to a high frequency control signal and to convert a high frequency control signal to a low frequency control signal. As another example, the outside vehicle electronics 305 can include a cellular modem, a WiFi® router, and an access point coupled to cellular and WiFi® antennas, and the inside vehicle electronics 350 can be devoid of a cellular modem, router, and an access point. By way of further example, the outside vehicle electronics 305 can be devoid of a cellular modem, router, and an access point, and the inside vehicle electronics 350 can include a cellular modem, WiFi® router, and access point coupled to cellular and WiFi® antennas.

According to some embodiments, the antenna assembly 130 includes a GPS unit 134*a* which includes a receive (RX) module. Signals received by the GPS unit 134*a* are communicated to a GPS port 344*a* of the vehicle electronics 350 via a GPS RF coupler 321*a*. The GPS RF coupler 321*a* includes a substantially transparent first GPS RF coupler 306*a* affixed to the inside of the glass 104 using a substantially transparent adhesive 308*a*. The GPS RF coupler 321*a* also includes a substantially transparent second GPS RF coupler 326*a* affixed to the outside of the glass 104 using a substantially transparent adhesive 328*a*. As previously discussed, the adhesives 308*a* and 328*a* can be the same or different type of adhesive. The first and second GPS RF couplers 306*a*, 326*a* facilitate wireless transmission of GPS signals from the GPS unit receiver module 134*a* to the GPS port 344*a* through the glass 104.

The antenna assembly 130 can include one or more additional antenna units 134*b*-134*n*, each of which includes a transceiver (TX/RX) module. As previously discussed, each of the antenna units 134*b*-134*n* can be coupled to a corresponding modem housed within the antenna assembly 130. The antenna units 134*b*-134*n* can be any of the types listed above. Each of the antenna units 134*b*-134*n* is communicatively coupled to a corresponding RF port 344*b*-344*n* via an information transfer coupler 321*b*-321*n*. One or both of data and control signals (e.g., UART, $I^2C$, SPI signals) are communicated through the glass 104 using an information transfer coupler 321*b*-321*n*.

Each of the information transfer couplers 321*b*-321*n* includes a substantially transparent first coupler 306*b*-306*n* affixed to the inside of the glass 104 using a substantially transparent adhesive 308*b*-308*n*. Each of the information transfer couplers 321*b*-321*n* also includes a substantially transparent second coupler 326*b*-326*n* affixed to the outside of the glass 104 using a substantially transparent adhesive 328*b*-328*n*. As previously discussed, the adhesive 308*b*-308*n* and 328*b*-328*n* can be the same or different type of adhesive. The first and second couplers 306*b*-306*n*, 326*b*-326*n* facilitate wireless transmission of data and control signals between antenna units 134*b*-134*n* and RF port 344*b*-344*n* of the vehicle electronics 350.

Figure 3B:
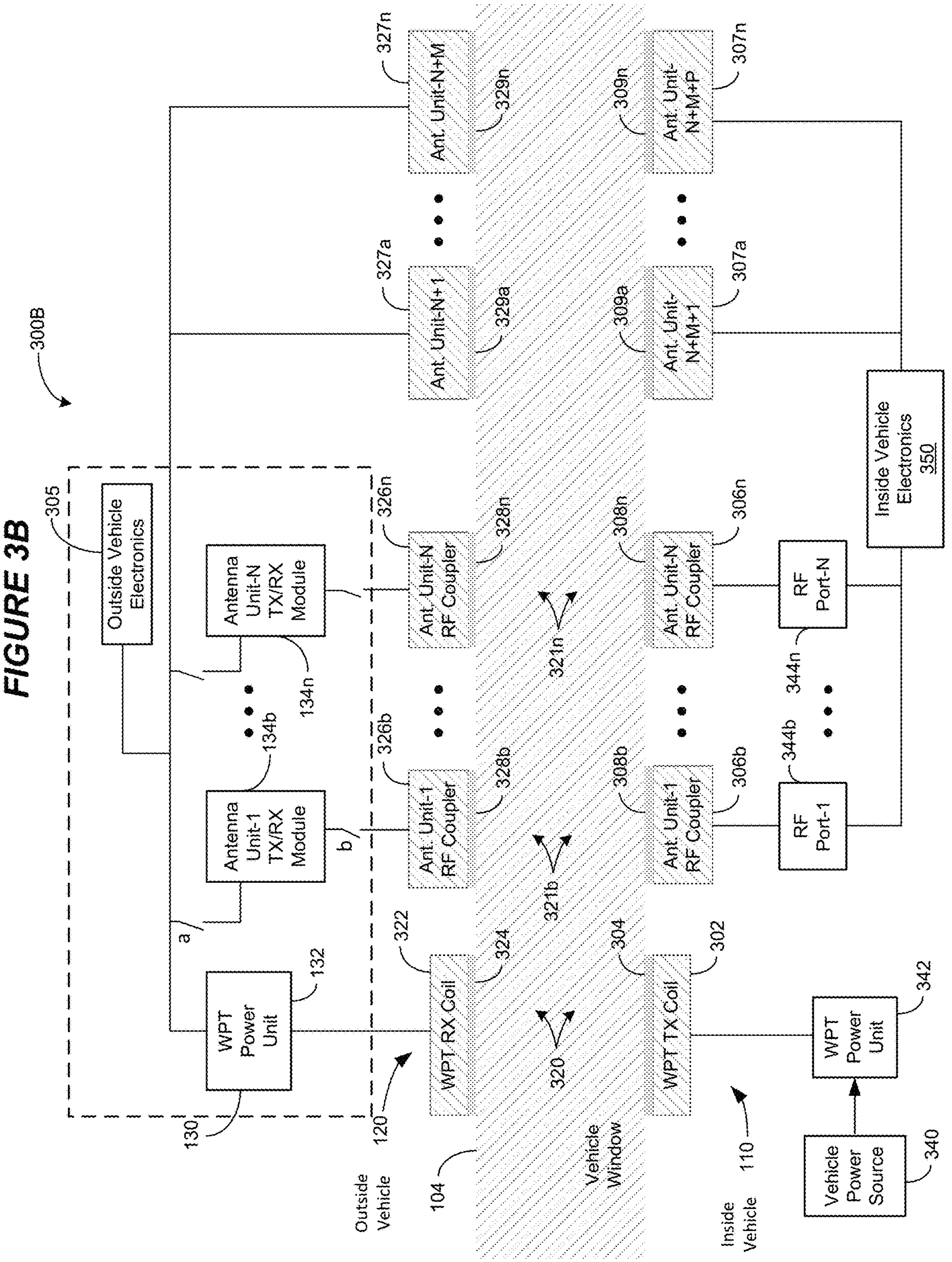
FIG. 3B illustrates a non-invasive communication apparatus for a vehicle in accordance with any of the embodiments disclosed herein.

FIG. 3B illustrates a non-invasive communication apparatus for a vehicle in accordance with any of the embodiments disclosed herein. The apparatus 300B is similar to that shown in FIG. 3A but includes substantially transparent antenna units affixed to the glass 104. FIG. 3B shows a substantially transparent antenna unit 307*a*, 307*n* affixed to the inside of the glass 104 using a substantially transparent adhesive 309*b*-309*n*. FIG. 3B also shows a substantially transparent antenna unit 327*a*, 327*n* affixed to the outside of the glass 104 using a substantially transparent adhesive 329*b*-329*n*. In some implementations, the substantially transparent antenna units 307*a*-307*n*, 327*a*-327*n* can be configured as narrow-band antennas (e.g., WiFi® antennas, terrestrial radio antennas) disposed on the glass 104, which can provide for a reduction in the size of the antenna assembly 130.

Figure 4A:
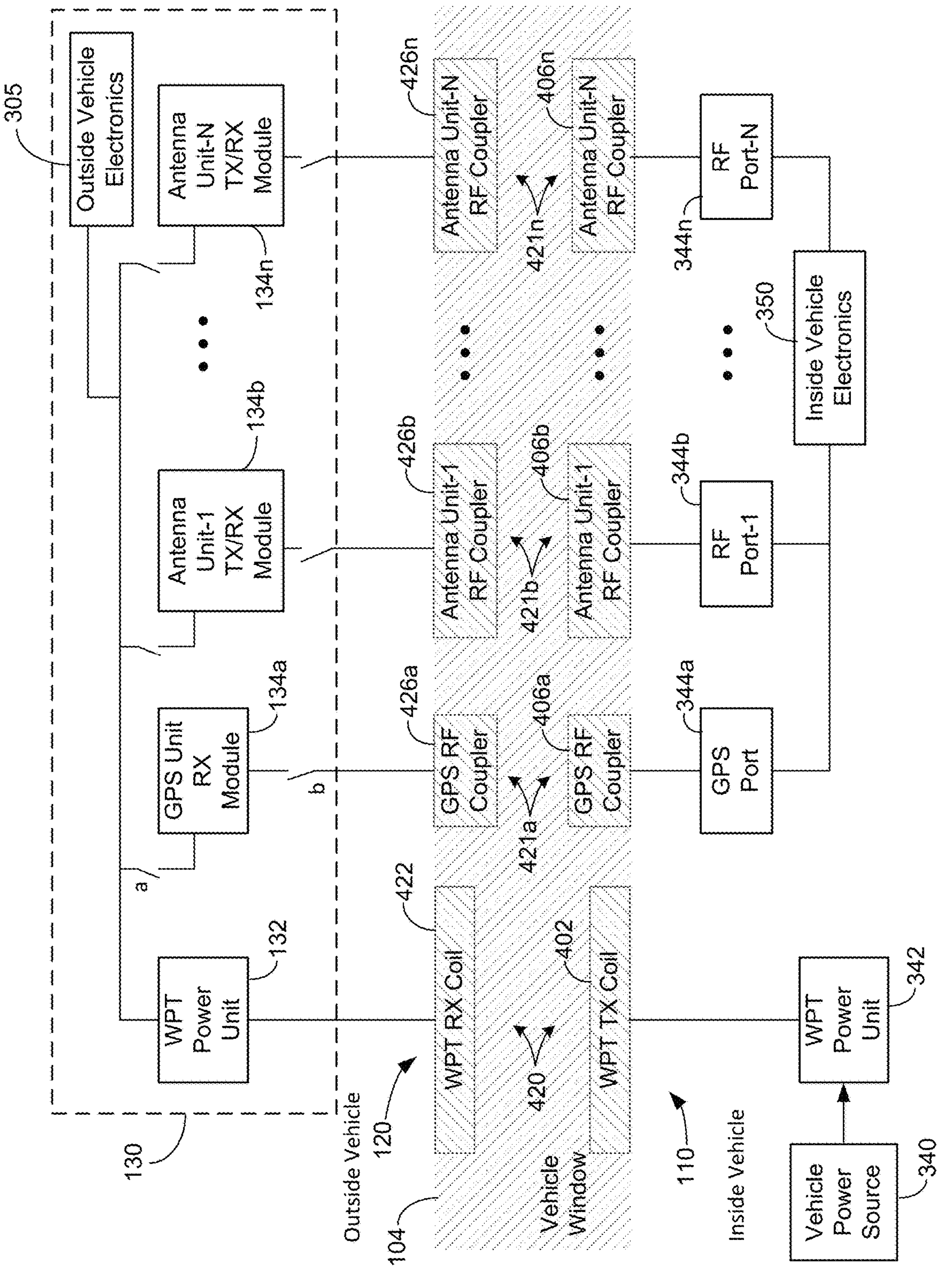
FIG. 4A illustrates a non-invasive communication apparatus for a vehicle in accordance with any of the embodiments disclosed herein.

FIG. 4A illustrates a non-invasive communication apparatus for a vehicle in accordance with any of the embodiments disclosed herein. The apparatus 400A is similar to that shown in FIG. 3A but differs in terms of the power transfer and information couplings disposed on the glass of the vehicle. In the embodiment shown in FIG. 4A, the power transfer coupler 420 includes a substantially transparent transmit coil 402 which is an integrally formed structure of the inside surface of the glass 104. The power transfer coupler 420 also includes a substantially transparent receive coil 422 which is an integrally formed structure of the outside surface of the glass 104. The transmit and receive coils 402, 422 can be etched structures comprising a substantially transparent conductive material (e.g., ITO, IZO, AZO, CNT).

As in the case of the embodiment shown in FIG. 3A, the apparatus 400A shown in FIG. 4A also includes one or more information transfer couplers 421*a*-421*n* configured to wirelessly communicate information signals to and/or from the antenna assembly 130 via the glass 104. Each of the information transfer couplers 421*a*-421*n* includes a substantially transparent first coupler 406*a*-406*n* which is an integrally formed structure of the inside surface of the glass 104. Each of the information transfer couplers 421*a*-421*n* also includes a substantially transparent second coupler 426*a*-426*n* which is an integrally formed structure of the outside surface of the glass 104 and positioned adjacent the first RF coupler 406*a*-406*n*. The first and second RF couplers 406*a*-406*n* and 426*a*-426*n* can be etched structures comprising a substantially transparent conductive material (e.g., ITO, IZO, AZO, CNT).

Figure 4B:
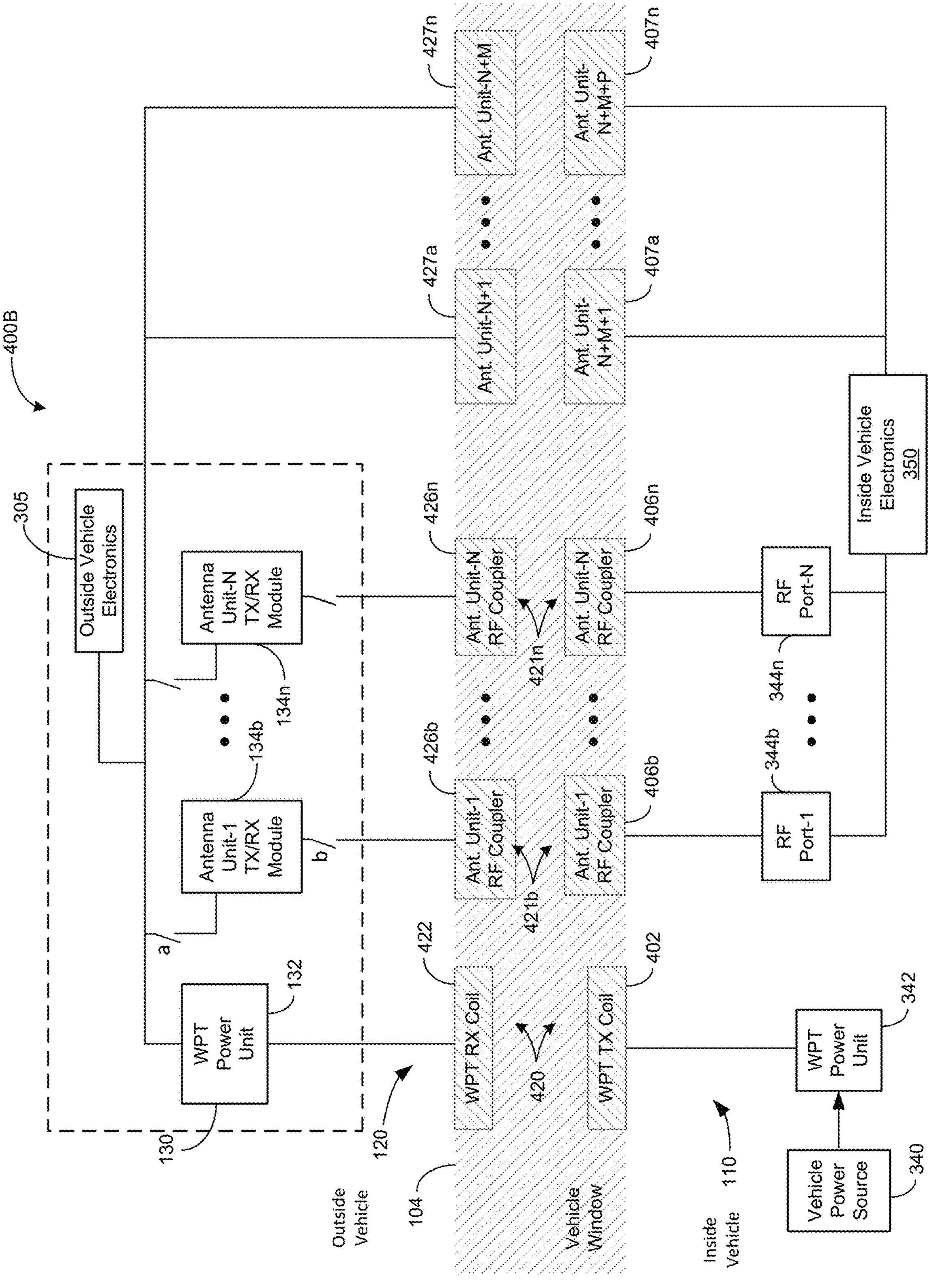
FIG. 4B illustrates a non-invasive communication apparatus for a vehicle in accordance with any of the embodiments disclosed herein.

FIG. 4B illustrates a non-invasive communication apparatus for a vehicle in accordance with any of the embodiments disclosed herein. The apparatus 400B is similar to that shown in FIG. 4A but includes substantially transparent antenna units which are integrally formed structures of the glass 104. FIG. 4B shows a substantially transparent antenna unit 407*a*, 407*n* which is an integrally formed structure of the inside of the glass 104. FIG. 4B also shows a substantially transparent antenna unit 427*a*, 427*n* which is an integrally formed structure of the outside of the glass 104. In some implementations, the substantially transparent antenna units 407*a*-407*n*, 427*a*-427*n* can be configured as narrowband antennas (e.g., WiFi® antennas, terrestrial radio antennas) disposed on the glass 104, which can provide for a reduction in the size of the antenna assembly 130. The substantially transparent antenna units 407*a*-407*n*, 427*a*-427*n* can be etched structures comprising a substantially transparent conductive material (e.g., ITO, IZO, AZO, CNT).

In some embodiments, the apparatuses 300A-300B, 400A-400B shown in FIGS. 3A-3B and 4A-4B can include any combination of adhesively affixed couplers and etched couplers. For example, the power transfer coupler 320, 420 can be adhesively affixed to the glass, and the information transfer couplers 321*a*-321*n*, 421*a*-421*n* can be etched structures of the glass. As another example, the information transfer couplers 321*a*-321*n*, 421*a*-421*n* can be adhesively affixed to the glass, and the power transfer coupler 320, 420 can be etched structures of the glass. By way of further example, the information transfer couplers 321*a*-321*n* 421*a*-421*n* can include a combination of adhesively affixed couplers and etched couplers.

As is shown in FIGS. 3A-4B, the outside vehicle electronics 305 and the inside vehicle electronics 350 can be selectively coupled to different antenna units 134*a*-134*n*. For example, the outside vehicle electronics 305 can be coupled to the GPS unit 134*a* (e.g., via closed/used path a, with path b remaining open/unused), and the inside vehicle electronics 350 can be coupled to a WiFi® unit 134*b* (via closed/used path b, with path a remaining open/unused). Although shown as including switches in FIGS. 3A-4B, it is understood that selective coupling of different antenna units 134*a*-134*n* respectively to the outside and inside vehicle electronics 305, 350 is typically implemented via control logic according to the following table:

TABLE 1

| Ant_a/Ant_b (0: open/1: connect) | |
|---|---|
| 00 | N/A |
| 01 | Support (1 antenna) |
| 10 | Support (1 antenna) |
| 11 | Support (2 antennas on same board) |

According to Table 1, the first numeral represents the state of antenna coupling to/usage by the outside vehicle electronics 305 with respect to a specified antenna unit (e.g., WiFi®, LTE, GPS). The second number represents the state of antenna coupling to/usage by the inside vehicle electronics 350 with respect to a specified antenna unit. In the case of logic state 11, and according to some implementations, this logic state results in two antennas on the same board (e.g., one LTE antenna and one WiFi® antenna being coupled to/used by the outside or inside vehicle electronics 305, 350). It is noted that additional logic conditions that result in connectivity of specific antenna units 134*a*-134*n* are not shown, but would be readily understood by one of ordinary skill in view of the discussion above.

Figure 5:
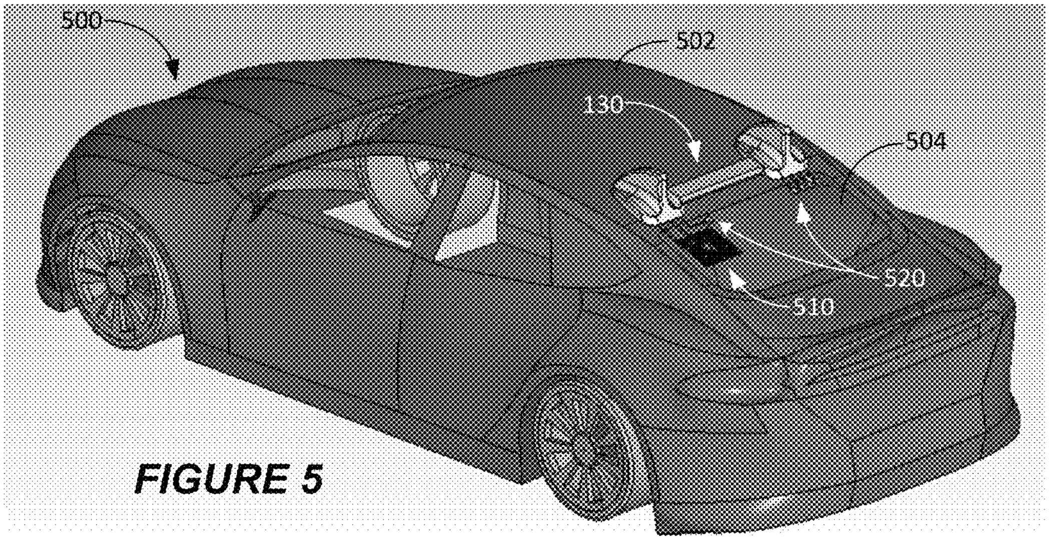
FIG. 5 illustrates a vehicle equipped with a non-invasive communication apparatus in accordance with any of the embodiments disclosed herein.
Figure 6:
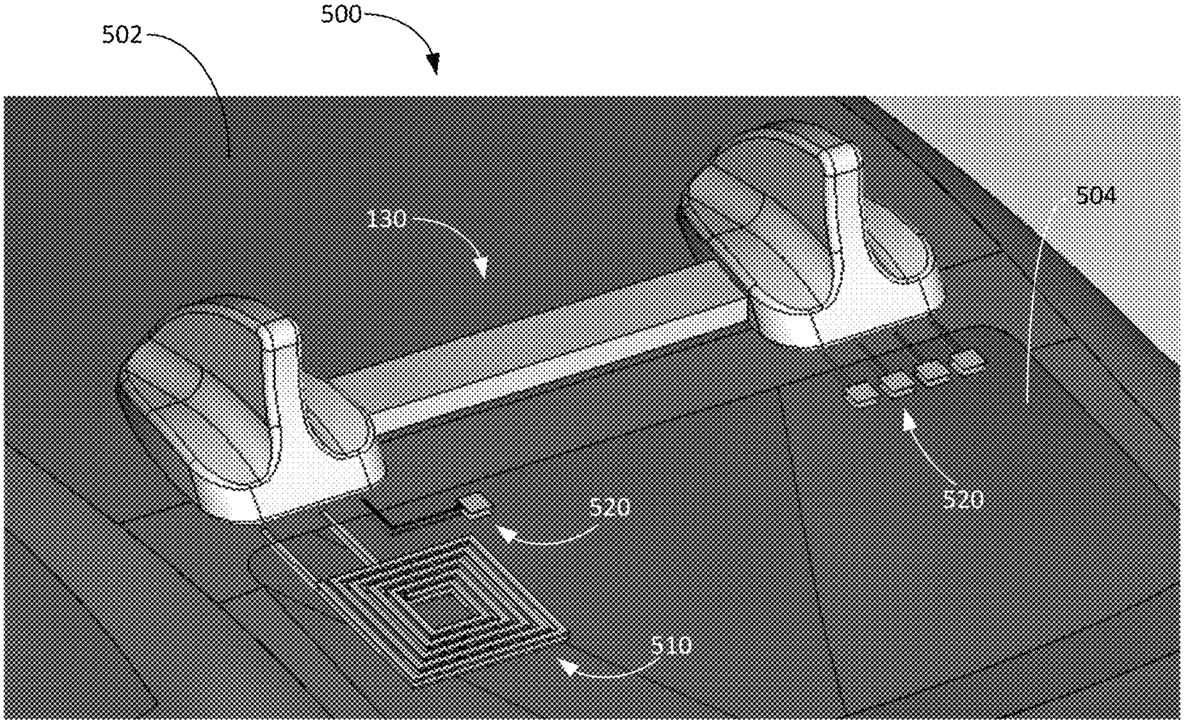
FIG. 6 illustrates a vehicle equipped with a non-invasive communication apparatus in accordance with any of the embodiments disclosed herein.

FIGS. 5 and 6 illustrate a vehicle 500 equipped with a non-invasive communication apparatus in accordance with any of the embodiments disclosed herein. It is understood that the vehicle 500 can represent any type of vehicle or vessel (e.g., a boat, ship, airplane, helicopter), and that the depiction of the vehicle 500 as an automobile is for purposes of illustration and not of limitation.

The vehicle 500 includes rear window glass 504 extending from a roof 502 of the vehicle 500. An antenna assembly 130 is shown mounted to the roof 502 in proximity to the glass 504. A power transfer coupler 510 (e.g., corresponding to power transfer coupler 320, 420) is shown disposed on the inside and outside of the glass 504 at an upper left corner location of the glass 504. As previously described, the power transfer coupler 510 is substantially transparent such that an observer (e.g., driver, pedestrian) of the vehicle 500 can see through the power transfer coupler 510.

One or more information transfer couplers 520 (e.g., corresponding to information transfer couplers 321*a*-321*n*, 421*a*-421*n*) are shown disposed on the inside and outside of the glass 504 in the upper left and right corner locations of the glass 504. As previously described, the information transfer couplers 520 are substantially transparent. In some implementations, a substantially transparent protective coating can be applied over the outside components of the power transfer coupler 510 and the information transfer couplers 522 provide environmental protection (e.g., against UV, water, road debris, etc.). A substantially transparent protective coating can also be applied over the inside components of the power transfer coupler 510. Suitable protective coatings include transparent marine epoxy and transparent ceramic coatings, for example.

Figure 7:
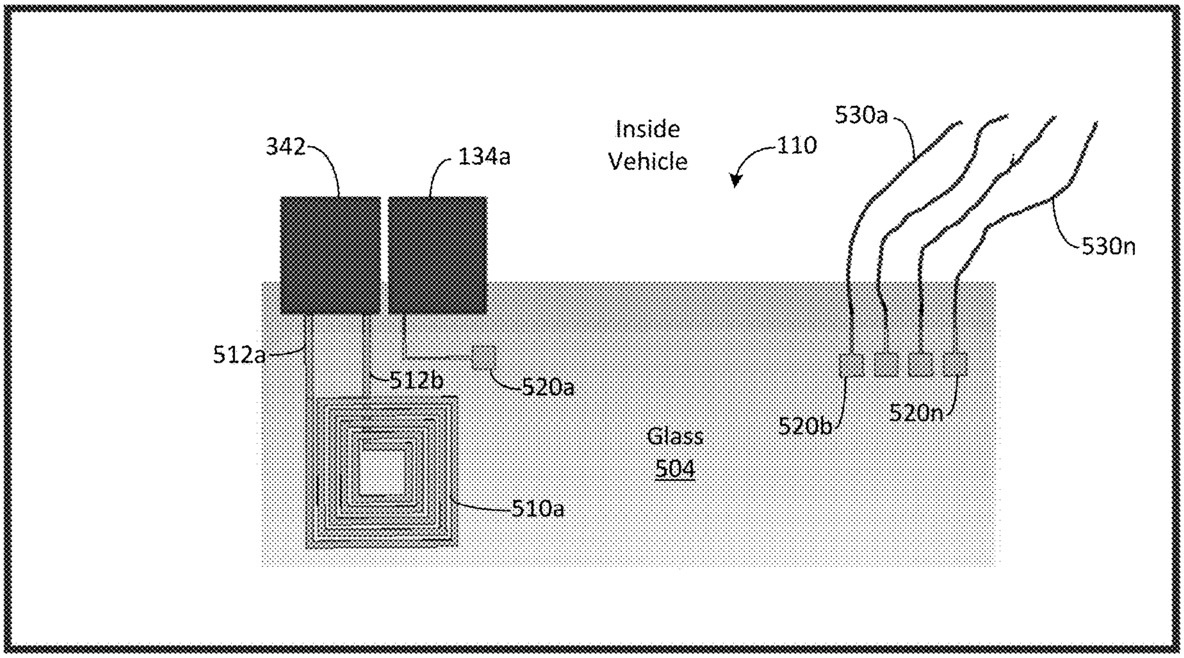
FIG. 7 illustrates components of an Inside Vehicle Unit in accordance with any of the embodiments disclosed herein.
Figure 8:
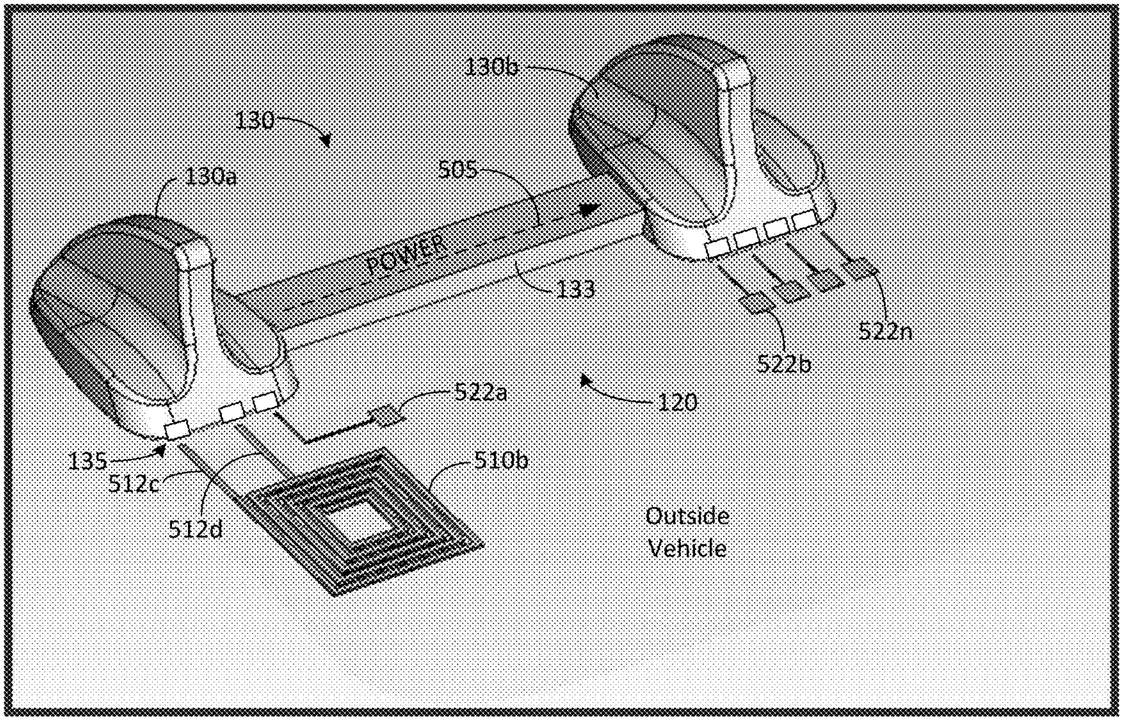
FIG. 8 illustrates components of an Outside Vehicle Unit in accordance with any of the embodiments disclosed herein.

FIG. 7 illustrates components of an IVU (Inside Vehicle Unit) 110 in accordance with any of the embodiments disclosed herein. FIG. 8 illustrates components of an OVU (Outside Vehicle Unit) 120 in accordance with any of the embodiments disclosed herein. The IVU 110 includes a substantially transparent inside transmit coil 510*a* affixed on, or etched into, an inside surface of glass 104 of the vehicle. The OVU 120 includes a substantially transparent outside receive coil 510*b* affixed on, or etched into, and outside surface of glass 104 of the vehicle in proximity to, and in alignment with, the inside transmit coil 510*a*. Together, the inside and outside coils 510*a*, 510*b* define a substantially transparent power transfer coupler (see, e.g., power transfer coupler 320, 420 shown in FIGS. 3A-3B and 4A-4B). It is understood that the IVU 110 can include a single transmit coil 510*a* or a multiplicity of transmit coils 510*a*. It is also understood that the OVU 120 can include a single receive coil 510*b* or multiplicity of receive coils 510*b*. The number of transmit coils 510*a* can be the same as, or different from, the number of receive coils 510*b*. The number of transmit and receive coils 510*a*, 510*b* may be selected based on the power requirements of the antenna assembly 130. For example, the IVU 110 and OVU 120 can include one, two, three or four inside and/or outside coils 510*a*, 510*b* (e.g., equal or unequal in number).

The inside transmit coil 510*a* includes leads 512*a*, 512*b* which are electrically coupled to an inside transmit WPT power unit 342 (e.g., see FIGS. 3A-3B and 4A-4B). The inside transmit WPT power unit 342 can be situated anywhere in the vehicle. The inside transmit WPT power unit 342 is electrically coupled to, and derives power from, a power source 340 of the vehicle (e.g., a battery or alternator). The outside receive coil 510*b* includes leads 512*c*, 512*d* which are electrically coupled to an outside receive WPT power unit 132 (e.g., see FIGS. 3A-3B and 4A-4B) disposed in a housing 130*a* of the antenna assembly 130. The leads 512*c*, 512*d* are coupled to the outside receive WPT power unit 132 via ports 135.

In the embodiment shown in FIG. 8, the antenna assembly 130 includes a GPS receive unit 134*a* (see, e.g., FIGS. 3A-3B and 4A-4B) which can be situated in the housing 130*a*. Additionally, or alternatively, the antenna assembly 130 can include one or more disparate antenna units 134*b*-134*n* each comprising a transceiver (TX/RX) module. The antenna units 134*b*-134*n* can be situated in housing 130*b* which is shown spaced apart from housing 130*a* by channel member 133. It is understood that the antenna units 134*b*-134*n* can typically include a number of power-consuming components such as amplifiers, controllers, processors, digital and analog circuitry, and a modem. As is indicated by the dashed line extending across the channel member 133, power is supplied to the antenna units 134*b*-134*n* situated in housing 130*b* via a power connection 505 running from the WPT power unit 132 in housing 130*a* and along the length of the channel member 133.

The IVU 110 includes a substantially transparent inside GPS RF coupler 520*a* affixed on, or etched into, an inside surface of glass 104 of the vehicle. The OVU 120 includes a substantially transparent outside GPS RF coupler 522*a* affixed on, or etched into, an outside surface of glass 104 of the vehicle. The outside GPS RF coupler 522*a* is coupled to an electrical conductor which terminates at a GPS port 344*a* of the vehicle electronics 350.

The IVU 110 can also include one or more substantially transparent inside couplers 520*b*-520*n* affixed on, or etched into, an inside surface of glass 104 of the vehicle. The OVU 120 can include a corresponding number of substantially transparent outside couplers 522*b*-522*n* affixed on, or etched into, an outside surface of glass 104 of the vehicle. Each of the outside couplers 522*b*-522*n* is coupled to a respective electrical conductor 530*a*-530*n* which terminate at RF ports 344*b*-344*n* of the vehicle electronics 350. It is noted that the substantially transparent inside and outside couplers 520*b*-520*n*, 522*b*-522*n* comprise metal and a dielectric to facilitate electrical or magnetic coupling according to different design requirements.

FIGS. 9A and 9B illustrate an example of coupling through glass 904 of a vehicle or vessel in accordance with any of the embodiments disclosed herein. FIGS. 9A and 9B illustrate substantially transparent information transfer couplers of a type previously described, which can comprise one or both of a metal structure and a dielectric structure configured to transfer control signals and data via electrical or magnetic coupling. FIG. 9A illustrates inside and outside transmission lines 910*a*, 910*b* respectively affixed to, or etched into, the inside and outside surfaces of glass 904 of the vehicle/vessel in accordance with some embodiments. FIG. 9B illustrates inside and outside coupling circuits 930*a*, 930*b*, which can be of any pattern (e.g., patch, monopole, slot, loop, etc.). The transmission lines shown in FIG. 9A can be representative of power and ground traces, and the coupling circuit shown in FIG. 9B can be representative of a coil structure. It is noted that a matching circuit can be integrated with either the transmission line or the coupling circuits.

The transmission lines illustrated in FIG. 9A can be implemented as stripline transmission lines which include metallic ground planes 912, 920 (e.g., ITO, IZO, AZO, CNT), dielectric substrates 914, 918 (e.g., plastic substrates), and trace conductor 916 (e.g., ITO, IZO, AZO, CNT) disposed between the dielectric substrates 914, 918. The coupling circuits shown in FIG. 9B can be implemented in a similar manner to construct coupling structures of any pattern (e.g., a metallic coupling element 934 disposed between dielectric substrates 932, 936).

According to some implementations, and with reference to FIGS. 3A-4B, a non-invasive communication apparatus according to various embodiments can be configured for use with a fixed structure comprising glass. The fixed structure can be a building, a home, a garage, a barn, a shed or other structure that is fixed to the ground. The non-invasive communication apparatus can comprise a power transfer coupler configured to wirelessly transfer power via the glass (e.g., 104) of the fixed structure. The power transfer coupler can comprise a substantially transparent transmit coil disposed on an inside surface of the glass (e.g., WPT TX coil 302, 402), and a substantially transparent receive coil disposed on an outside surface of the glass adjacent the transmit coil (e.g., WPT RX coil 322, 422). One or more information transfer couplers (e.g., 321*b*-321*n*, 421*b*-421*n*) can be configured to wirelessly communicate information signals via the glass. Each of the information transfer couplers comprises a substantially transparent first coupler disposed on the inside surface of the glass (e.g., 306*b*-306*n*, 406*b*-406*n*), and a substantially transparent second coupler disposed on the outside surface of the glass adjacent the first coupler (e.g., 326*b*-326*n*, 426*b*-426*n*). The substantially transparent power transfer coupler and information transfer couplers can be of a type previously described (sec, e.g., FIGS. 9A and 9B).

Figure 10:
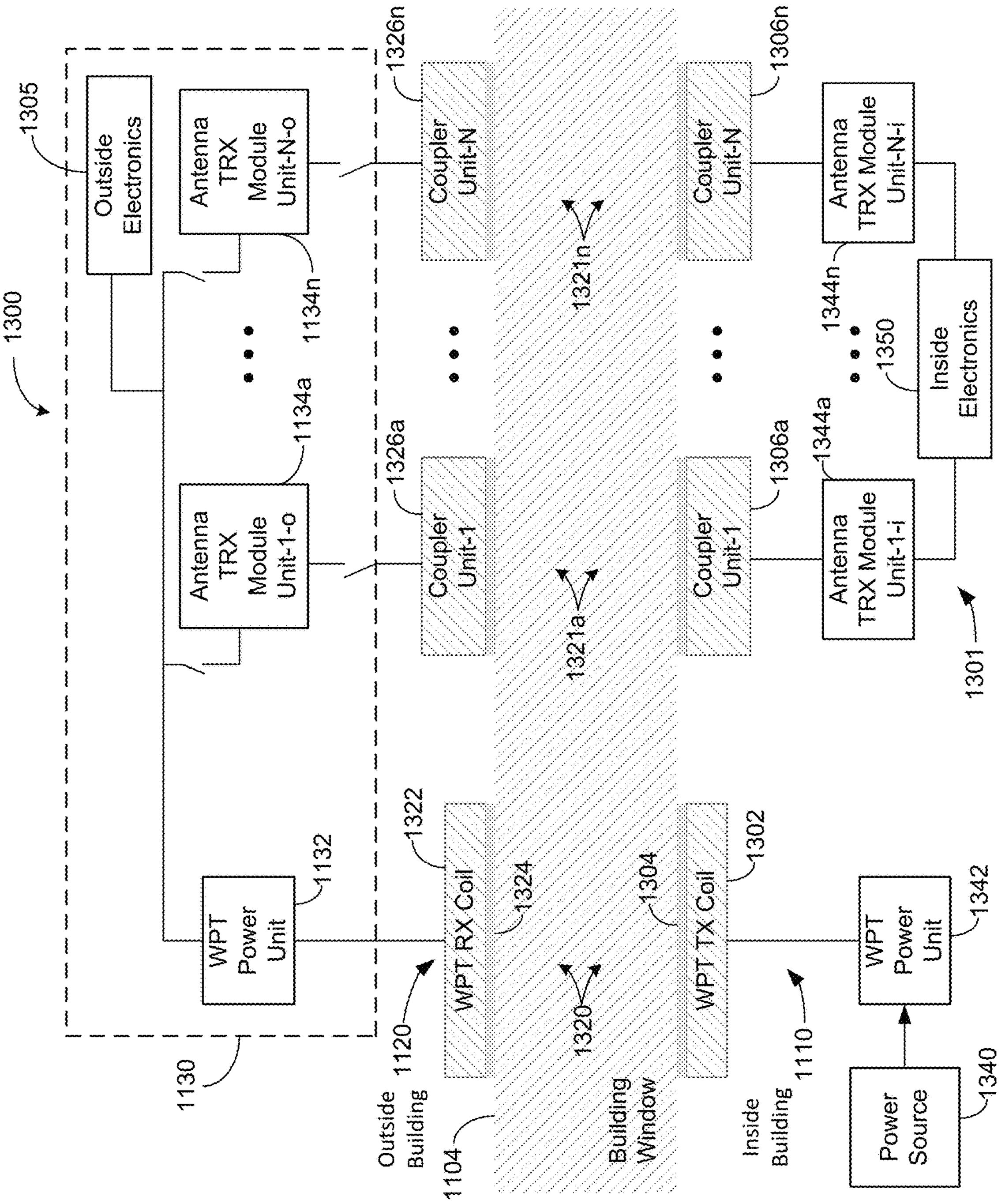
FIG. 10 illustrates a non-invasive communication apparatus for a fixed structure in accordance with any of the embodiments disclosed herein.

FIG. 10 illustrates a non-invasive communication apparatus configured for use with a fixed structure (e.g., a building) comprising glass in accordance with various embodiments. The apparatus 1300 includes a power transfer coupler 1320 configured to wirelessly supply power, via glass 1104 of the building, to an external assembly 1130 mounted to the building (e.g., adjacent to a glass window of the building). The power transfer coupler 1320 can include a substantially transparent transmit coil 1302 disposed on an inside surface of the glass 1104. The power transfer coupler 1320 can also include a substantially transparent receive coil 1322 disposed on an outside surface of the glass 1104 and positioned adjacent to the transmit coil 1302. The transmit and receive coils 1302, 1322 are preferably affixed to the glass 1104 using a substantially transparent adhesive 1304, 1324 of a type described above. Alternatively, the transmit and receive coils 1302, 1322 can be integrally formed structures of the glass 1104, as previously discussed. The transmit and receive coils 1302, 1322 are configured to wirelessly transmit power from a WPT power unit 1342 situated inside the building to a WPT power unit 1132 situated in the external assembly 1130 mounted on the outside of the building. The WPT power unit 1342 is coupled to a power source 1340 (e.g., a wall outlet) inside the building. The WPT power unit 1132 provides power to the outside electronics 1305 and modules 1134*a*-1134*n*.

The apparatus 1300 includes one or more information transfer couplers 1321*a*-1321*n* (e.g., RF couplers, optical couplers) configured to wirelessly communicate information signals to and/or from the external assembly 1130 via the glass 1104. Information transfer coupler 1321*a* includes a first coupler unit 1306*a* affixed to the inside surface of the glass 1104 and a second coupler unit 1326*a* affixed to the outside surface of the glass 1104. Information transfer coupler 1321*n* includes a first coupler unit 1306*n* affixed to the inside surface of the glass 1104 and a second coupler unit 1326*n* affixed to the outside surface of the glass 1104. The first and second coupler units 1306*a*-1306*n*, 1326*a*-1326*n* facilitate wireless transmission of data and/or control signals through the glass 1104. It is noted that the apparatus 1300 can include any number of information transfer couplers (e.g., 1, 2, 3, 4, 5 or more information transfer coupler 1321*a*-1321*n*).

Figure 11:
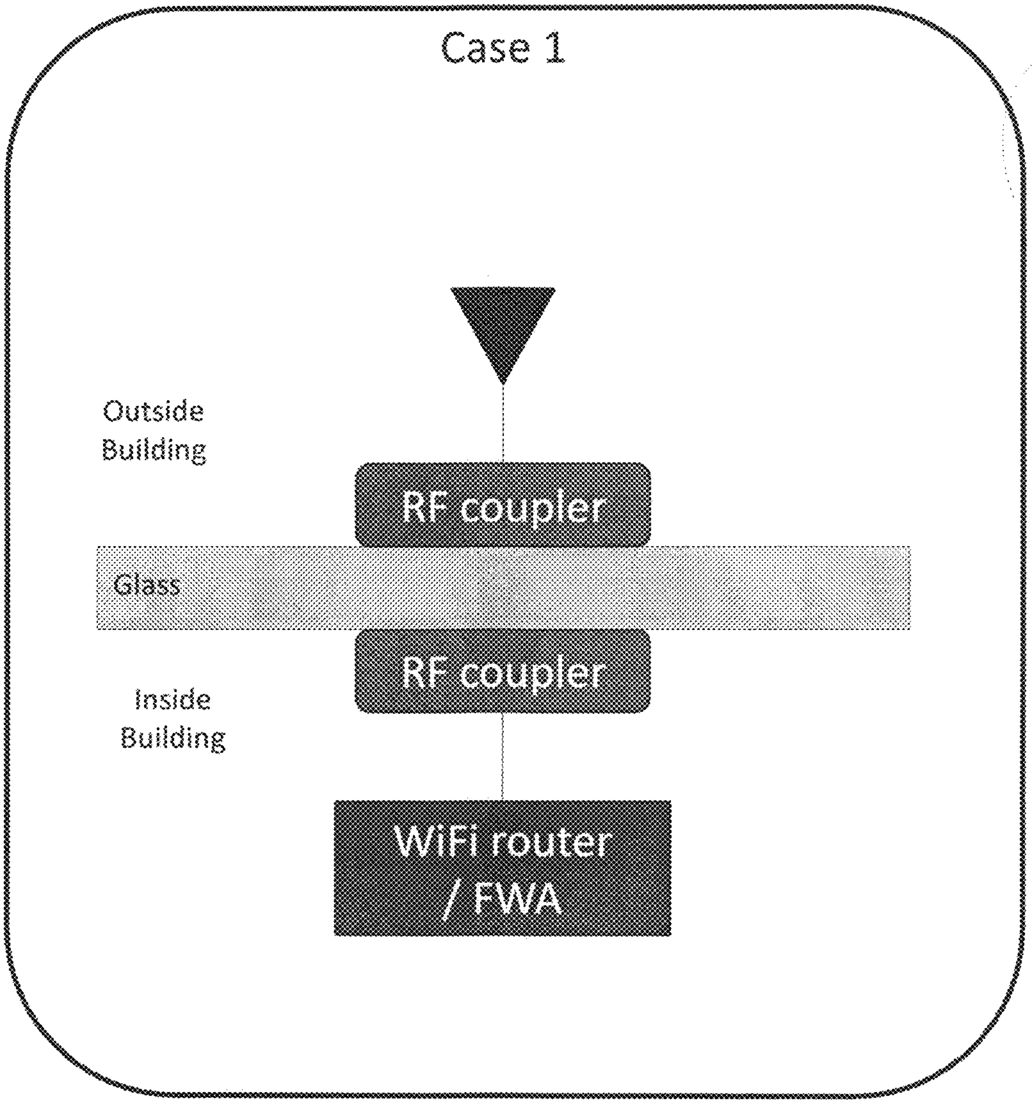
FIG. 11 illustrates a first configuration of a non-invasive communication apparatus for a fixed structure in accordance with any of the embodiments disclosed herein.
Figure 12:
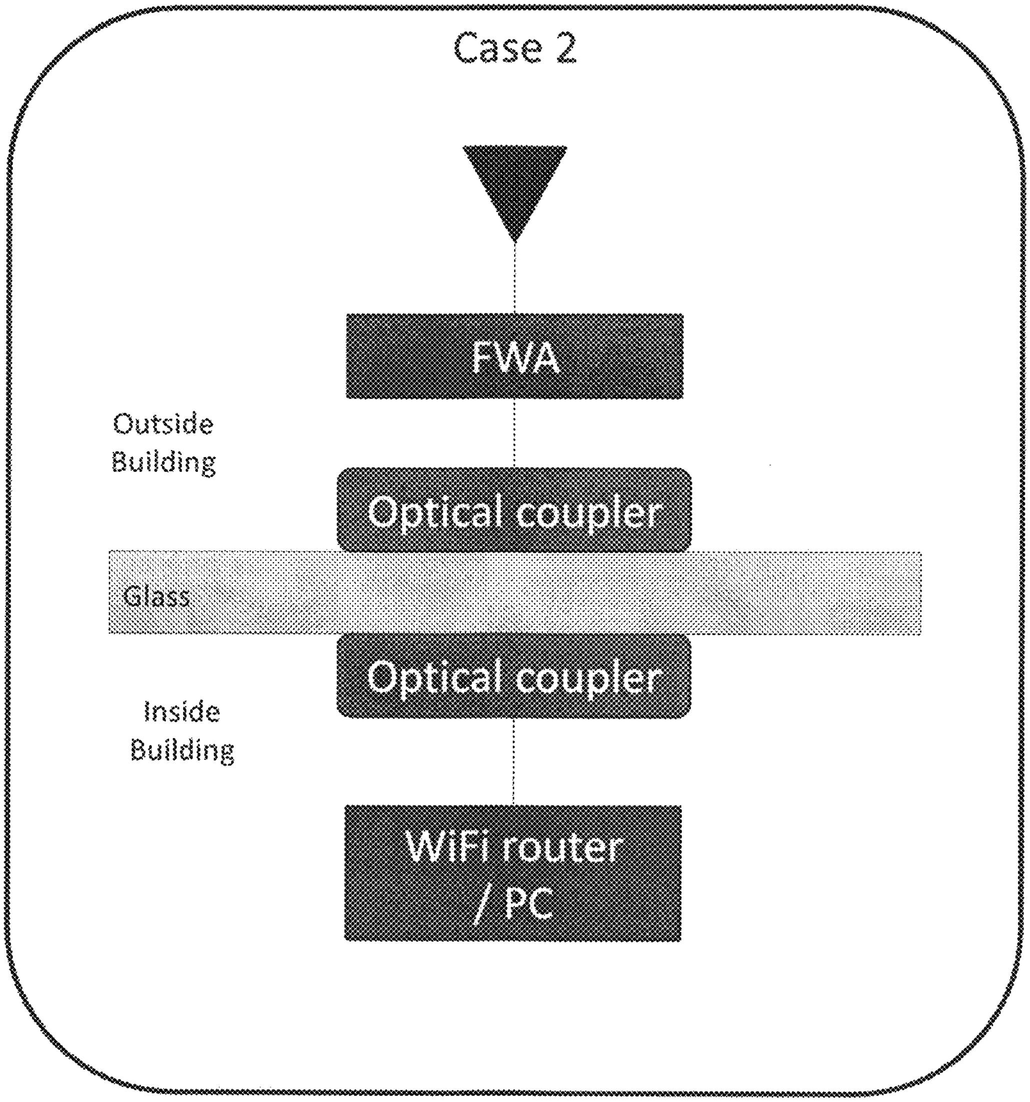
FIG. 12 illustrates a second configuration of a non-invasive communication apparatus for a fixed structure in accordance with any of the embodiments disclosed herein.
Figure 13:
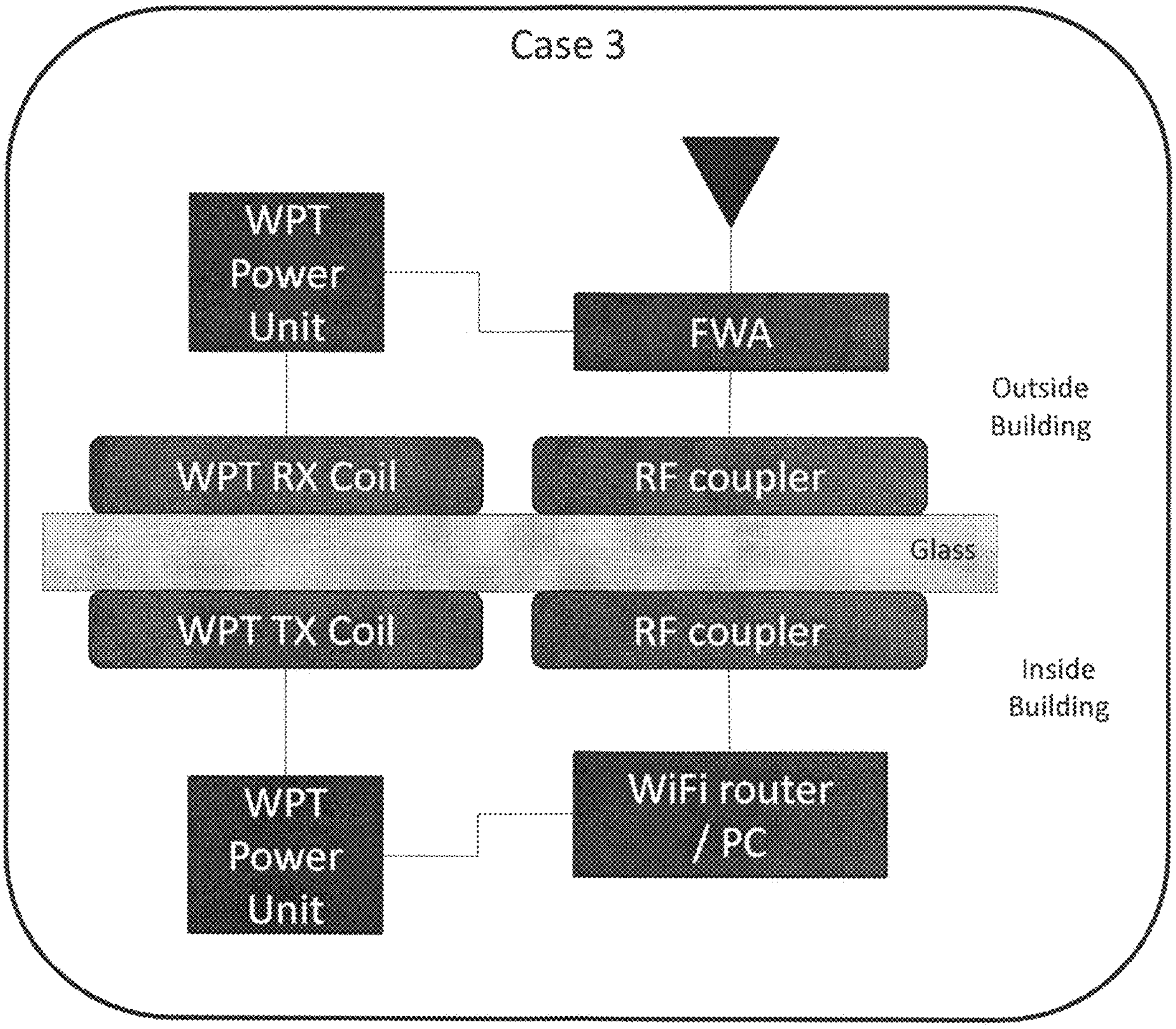
FIG. 13 illustrates a third configuration of a non-invasive communication apparatus for a fixed structure in accordance with any of the embodiments disclosed herein.

In some configurations, such as those illustrated in FIGS. 11 and 13, the first and second coupler units 1306*a*-1306*n*, 1326*a*-1326*n* include RF couplers (e.g., substantially transparent couplers). In other configurations, such as that illustrated in FIG. 12, the first and second coupler units 1306*a*-1306*n*, 1326*a*-1326*n* include optical couplers. In the case of optical couplers, the apparatus 1130 can include conversion electronics (e.g., components of the outside electronics 1134 or the inside electronics 1344). The conversion electronics can be configured to convert a digital signal (e.g., an Ethernet signal) to an optical signal for transmission through the glass 1104, and to convert the optical signal transmitted through the glass 1104 to a digital signal. As a non-limiting example, the conversion electronics can be configured to convert a digital signal to a corresponding Li-Fi (Light Fidelity) signal, and a Li-Fi signal to a corresponding digital signal. Li-Fi is an optical wireless communication technology which is capable of transmitting data at high speeds over the visible light, ultraviolet, and infrared spectrums (e.g., using LEDs). It is noted that, in the case of optical couplers, the first and second coupler units 1306*a*-1306*n*, 1326*a*-1326*n* can include structures (e.g., reflectors) to concentrate the energy and strengthen the optical link 1321*a*, 1321*n*. The reflectors can include a parabolic dish structure and be metallic or formed from electroplated plastic.

In the arrangement shown in FIG. 10, external assembly 1130 (e.g., situated on the exterior of the building) includes external modules 1134*a*-1134*n*. An inside assembly 1301 (e.g., situated in the interior of the building) includes inside modules 1344*a*-1344*n*. The components of the external modules 1134*a*-1134*n* and the inside modules 1344*a*-1344*n* can vary depending on the particular configuration and functionality of the apparatus 1300. For example, the external modules 1134*a*-1134*n* and inside modules 1344*a*-1344*n* can be configured to contain one of four different types of components: (1) an antenna (e.g., of a type previously described); (2) a TRX (transceiver) module; (3) an antenna plus a TRX module; and (4) a transmission line (e.g., a coaxial cable). It is understood that the components of the external modules 1134*a*-1134*n* can be the same as, or differ from, those of the inside modules 1344*a*-1344*n*.

According to a first configuration of the apparatus 1300 (see FIG. 11, Case 1), external modules 1134*a*-1134*n* each include an antenna of a type previously described, and the inside modules 1344*a*, 1344*n* each include a transmission line. The antenna of external module 1134*a* is connected to RF coupler unit 1326*a* via an appropriate transmission line. In this first configuration, the connection between the antenna of external module 1134*a* and RF coupler unit 1326*a* need not be a switchable connection as is shown in FIG. 10. RF signals are communicated through the glass 1104 via the first and second RF coupler units 1306*a*-1306*n*, 1326*a*-1326*n*. For example, RF signals can be communicated along the transmission lines of inside modules 1344*a*-1344*n* for reception by inside electronics 1350. As is shown in FIG. 11, the inside electronics 1350 can include a Wi-Fi router and an FWA (Fixed Wireless Access) unit.

According to a second configuration of the apparatus 1300 (see FIG. 12, Case 2), external module 1134*a* includes a TRX module and external module 1134*n* includes an antenna of a type previously described. In this second configuration, inside module 1344*a* includes a TRX module. In this illustrative example, the inside electronics 1350 can include a Wi-Fi router or a PC.

The outside electronics 1305 are coupled to the TRX module of outside module 1134*a* and to the antenna of outside module 1134*n*. In this second configuration, the connections to/from external modules 1134*a* and 1134*n* need not be switchable connections as is shown in FIG. 10. In this configuration, the outside electronics 1305 includes an FWA unit, as is shown in FIG. 12, and the first and second coupler units 1306*a*-1306*n*, 1326*a*-1326*n* are configured to include optical couplers (e.g., which can include reflectors). The apparatus 1300 can include conversion electronics as previously described that convert a digital signal (e.g., an Ethernet signal from an Ethernet port of the FWA unit) to an optical signal for transmission through the glass 1104, and to convert the optical signal transmitted through the glass 1104 to a digital signal. The second configuration of apparatus 1300 facilitates the communication of data and control signals between the external assembly 1130 and the inside assembly 1301 via the glass 1104.

According to a third configuration of the apparatus 1300 (see FIG. 13, Case 3), the external module 1134*a* includes a TRX module and the inside module 1344*a* includes a TRX module. In this third configuration, the connections to/from external module 1134*a* need not be switchable connections as is shown in FIG. 10. The outside electronics 1305 can include an FWA unit, as is shown in FIG. 13. The apparatus 1300 facilitates the communication of control signals between the WPT power unit 1342 situated inside the building and the WPT power unit 1132 situated in the external assembly 1130 outside of the building. For example, control signals can be communicated between the WPT power unit 1342 and the WPT power unit 1132 to implement a closed-loop power control process.

In one representative example, the FWA unit may require 8 W of power from the outside WPT power unit 1132. In this example, the inside WPT power unit 1342 may supply 10 W but only 5 W is received by the outside WPT power unit 1132 due to various transmission losses. In response to the need for additional power, the outside WPT power unit 1132 communicates a control signal to the inside WTP power unit 1342 via the external module 1134*a*, second coupler unit 1326*a*, first coupler unit 1306*a*, and inside module 1344*a*. In response to the control signal, the inside WTP power unit 1342 increases the output power to 15 W, for example, which allows the outside WPT power unit 1132 to supply the required 8 W (after losses) to the FWA. In some configurations, the control signals are Bluetooth signals, in which case the TRX modules of the external and inside modules 1134*a*, 1344*a* are Bluetooth transceiver modules. In such configurations, the first and second coupler units 1306*a*, 1326*a* include RF couplers.

Although the discussion of FIGS. 10-13 is directed to the apparatus 1300 implemented for a fixed structure, the different configurations discussed above can be implemented for use with vehicles.

Although reference is made herein to the accompanying set of drawings that form part of this disclosure, one of at least ordinary skill in the art will appreciate that various adaptations and modifications of the embodiments described herein are within, or do not depart from, the scope of this disclosure. For example, aspects of the embodiments described herein may be combined in a variety of ways with each other. Therefore, it is to be understood that, within the scope of the appended claims, the claimed invention may be practiced other than as explicitly described herein. For example, and according to various embodiments, power and information signals can be transmitted through materials other than glass (e.g., plastic, woven fabrics, etc.).

All references and publications cited herein are expressly incorporated herein by reference in their entirety into this disclosure, except to the extent they may directly contradict this disclosure. Unless otherwise indicated, all numbers expressing feature sizes, amounts, and physical properties used in the specification and claims may be understood as being modified either by the term "exactly" or "about." Accordingly, unless indicated to the contrary, the numerical parameters set forth in the foregoing specification and attached claims are approximations that can vary depending upon the desired properties sought to be obtained by those skilled in the art utilizing the teachings disclosed herein or, for example, within typical ranges of experimental error.

The recitation of numerical ranges by endpoints includes all numbers subsumed within that range (e.g. 1 to 5 includes 1, 1.5, 2, 2.75, 3, 3.80, 4, and 5) and any range within that range. Herein, the terms "up to" or "no greater than" a number (e.g., up to 50) includes the number (e.g., 50), and the term "no less than" a number (e.g., no less than 5) includes the number (e.g., 5).

The terms "coupled" or "connected" refer to elements being attached to each other either directly (in direct contact with each other) or indirectly (having one or more elements between and attaching the two elements). Either term may be modified by "operatively" and "operably," which may be used interchangeably, to describe that the coupling or connection is configured to allow the components to interact to carry out at least some functionality (for example, a radio chip may be operably coupled to an antenna element to provide a radio frequency electric signal for wireless communication).

Terms related to orientation, such as "top," "bottom," "side," and "end," are used to describe relative positions of components and are not meant to limit the orientation of the embodiments contemplated. For example, an embodiment described as having a "top" and "bottom" also encompasses embodiments thereof rotated in various directions unless the content clearly dictates otherwise.

Reference to "one embodiment," "an embodiment," "certain embodiments," or "some embodiments," etc., means that a particular feature, configuration, composition, or characteristic described in connection with the embodiment is included in at least one embodiment of the disclosure. Thus, the appearances of such phrases in various places throughout are not necessarily referring to the same embodiment of the disclosure. Furthermore, the particular features, configurations, compositions, or characteristics may be combined in any suitable manner in one or more embodiments.

The words "preferred" and "preferably" refer to embodiments of the disclosure that may afford certain benefits, under certain circumstances. However, other embodiments may also be preferred, under the same or other circumstances. Furthermore, the recitation of one or more preferred embodiments does not imply that other embodiments are not useful and is not intended to exclude other embodiments from the scope of the disclosure.

As used in this specification and the appended claims, the singular forms "a," "an," and "the" encompass embodiments having plural referents, unless the content clearly dictates otherwise. As used in this specification and the appended claims, the term "or" is generally employed in its sense including "and/or" unless the content clearly dictates otherwise.

As used herein, "have," "having," "include," "including," "comprise," "comprising" or the like are used in their open-ended sense, and generally mean "including, but not limited to." It will be understood that "consisting essentially of," "consisting of," and the like are subsumed in "comprising," and the like. The term "and/or" means one or all of the listed elements or a combination of at least two of the listed elements.

The phrases "at least one of," "comprises at least one of," and "one or more of" followed by a list refers to any one of the items in the list and any combination of two or more items in the list.

What is claimed is:

1. A non-invasive communication apparatus for a fixed structure fixed to the ground and comprising glass, the apparatus comprising:

a power transfer coupler configured to wirelessly transfer power, via the glass of the fixed structure, to an external assembly configured to be mounted to an outside surface of the fixed structure, the power transfer coupler comprising:

a substantially transparent transmit coil disposed on an inside surface of the glass; and a substantially transparent receive coil disposed on an outside surface of the glass adjacent the transmit coil;

one or more information transfer couplers configured to wirelessly communicate information signals via the glass, each of the information transfer couplers comprising:

a substantially transparent first coupler disposed on the inside surface of the glass; and a substantially transparent second coupler disposed on the outside surface of the glass adjacent the first coupler and coupled with the external assembly; and an inside assembly configured to be situated inside the fixed structure and coupled with the first coupler, wherein each of the external assembly and the inside assembly comprises a transceiver and an antenna.

2. The apparatus according to claim 1, wherein the external assembly comprises an antenna, and the first and second couplers comprise radio frequency (RF) couplers.

3. The apparatus of claim 2, wherein the inside assembly comprises one or both of a Wi-Fi router and a Fixed Wireless Access unit.

4. The apparatus according to claim 1, wherein the external assembly comprises a Fixed Wireless Access unit coupled to an antenna.

5. The apparatus according to claim 4, wherein the first and second couplers comprise optical couplers.

6. The apparatus according to claim 4, wherein the first and second couplers comprise radio frequency (RF) couplers.

7. The apparatus according to claim 4, wherein the inside assembly comprises one or both of a Wi-Fi router and a computer.

8. The apparatus according to claim 1, wherein:

the transmit coil is configured for affixation, via a substantially transparent adhesive, to the inside surface of the glass; and the receive coil is configured for affixation, via a substantially transparent adhesive, to the outside surface of the glass.

9. The apparatus according to claim 1, wherein:

the transmit coil is an integrally formed structure of the inside surface of the glass; and the receive coil is an integrally formed structure of the outside surface of the glass.

10. The apparatus according to claim 1, wherein:

the first coupler is configured for affixation, via a substantially transparent adhesive, to the inside surface of the glass; and the second coupler is configured for affixation, via a substantially transparent adhesive, to the outside surface of the glass.

11. The apparatus according to claim 1, wherein:

the first coupler is an integrally formed structure of the inside surface of the glass; and the second coupler is an integrally formed structure of the outside surface of the glass.

12. The apparatus according to claim 1, wherein one or more of the information transfer couplers comprises one or both of a metal structure and a dielectric structure configured to transfer control signals and data via electrical or magnetic coupling.

13. A non-invasive communication apparatus for a fixed structure fixed to the ground and comprising glass, the apparatus comprising:

a power transfer coupler configured to wirelessly transfer power, via the glass of the fixed structure, to an external assembly configured to be mounted to an outside surface of the fixed structure, the power transfer coupler comprising:

a substantially transparent transmit coil disposed on an inside surface of the glass; and a substantially transparent receive coil disposed on an outside surface of the glass adjacent the transmit coil;

a plurality of information transfer couplers each coupled to one of a plurality of transceiver-antenna modules of the external assembly and one of a plurality of transceiver-antenna modules of an inside assembly configured to be situated inside the fixed structure and coupled with the first coupler, the information transfer couplers configured to wirelessly communicate information signals via the glass, each of the information transfer couplers comprising:

a substantially transparent first coupler disposed on the inside surface of the glass; and a substantially transparent second coupler disposed on the outside surface of the glass adjacent the first coupler and coupled with the external assembly.

14. The apparatus according to claim 13, comprising a switch arrangement configured to couple and decouple selected transceiver-antenna modules of the external assembly to/from the transceiver-antenna modules of the inside assembly.

15. A method of non-invasively communicating power and information via glass of a fixed structure fixed to the ground, the method comprising:

coupling power from a substantially transparent first power transfer coil disposed on an inside surface of the glass to a substantially transparent second power transfer coil disposed on an outside surface of the glass;

routing the coupled power to electronic circuitry of an external assembly mounted to an outside surface of the fixed structure; and coupling control signals and data between the external assembly and an inside assembly situated inside the fixed structure via the glass using a substantially transparent first coupler disposed on the inside surface of the glass and a substantially transparent second coupler disposed on the outside surface of the glass, wherein each of the external assembly and the inside assembly comprises a plurality of transceiver-antenna modules, and the external assembly comprises a switch arrangement; and the method comprises coupling and decoupling selected transceiver-antenna modules of the external assembly to/from the transceiver-antenna modules of the inside assembly using the switch arrangement.

16. The method according to claim 15, wherein the external assembly comprises an antenna, and the first and second couplers comprise radio frequency (RF) couplers.

17. The method of claim 16, wherein the inside assembly comprises one or both of a Wi-Fi router and a Fixed Wireless Access unit.

18. The method according to claim 15, wherein the external assembly comprises a Fixed Wireless Access unit coupled to an antenna.

19. The method according to claim 18, wherein the first and second couplers comprise optical couplers.

20. The method according to claim 18, wherein the first and second couplers comprise radio frequency (RF) couplers.

21. The method according to claim 18, wherein the inside assembly comprises one or both of a Wi-Fi router and a computer.

* * * * *